(12) United States Patent
Nakamura et al.

(10) Patent No.: US 11,524,265 B2
(45) Date of Patent: Dec. 13, 2022

(54) CARBON DIOXIDE SEPARATION MEMBRANE AND METHOD FOR PRODUCING SAME

(71) Applicant: Daicel Corporation, Osaka (JP)

(72) Inventors: Toshikazu Nakamura, Tokyo (JP); Masao Iwaya, Tokyo (JP); Takamasa Suzuki, Tokyo (JP); Tomohiro Goto, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 535 days.

(21) Appl. No.: 16/612,036

(22) PCT Filed: Apr. 27, 2018

(86) PCT No.: PCT/JP2018/017121
§ 371 (c)(1),
(2) Date: Nov. 8, 2019

(87) PCT Pub. No.: WO2018/211945
PCT Pub. Date: Nov. 22, 2018

(65) Prior Publication Data
US 2021/0154622 A1    May 27, 2021

(30) Foreign Application Priority Data

May 18, 2017   (JP) .............................. JP2017-099325

(51) Int. Cl.
*B01D 69/02*   (2006.01)
*A01G 7/02*    (2006.01)
(Continued)

(52) U.S. Cl.
CPC .............. *B01D 69/02* (2013.01); *A01G 7/02* (2013.01); *B01D 61/38* (2013.01);
(Continued)

(58) Field of Classification Search
None
See application file for complete search history.

(56) References Cited

U.S. PATENT DOCUMENTS

2008/0134895 A1* 6/2008 Ruud ................... B01D 53/228
                                                  96/9
2011/0067410 A1* 3/2011 Zubrin ................... F01K 13/00
                                                  60/39.12
(Continued)

FOREIGN PATENT DOCUMENTS

EP       1 935 476 A1    6/2008
JP       2001-333639 A   12/2001
(Continued)

OTHER PUBLICATIONS

Bara et al., "Improving $CO_2$ permeability in polymerized room-temperature ionic liquid gas separation membranes through the formation of a solid composite with a room-temperature ionic liquid," Polymers for Advanced Technologies (2008), vol. 19, pp. 1415-1420.

(Continued)

*Primary Examiner* — Jason M Greene
(74) *Attorney, Agent, or Firm* — Birch, Stewart, Kolasch & Birch, LLP

(57) ABSTRACT

A carbon dioxide separation membrane according to the present invention includes: an ionic liquid affinitive porous layer (C) having an ionic liquid-containing liquid (A) retained in voids; and an ionic liquid non-affinitive porous layer (B). The ionic liquid affinitive porous layer (C) may contain inorganic materials (for example, metal oxide particles having an average particle size of about 0.001 to 5 μm on a number basis). An average thickness of the ionic liquid affinitive porous layer (C) may be about from 0.01 to 10 μm. The ionic liquid affinitive porous layer (C) may include the ionic liquid-containing liquid (A) at a ratio from 0.1 to 99

(Continued)

parts by volume with respect to 100 parts by volume of voids. It may be a carbon dioxide separation membrane for fertilizing plants with carbon dioxide. The carbon dioxide separation membrane can reduce a size of the carbon dioxide concentrating device and enables smooth operation of the device.

14 Claims, 2 Drawing Sheets

(51) Int. Cl.
  *B01D 61/38* (2006.01)
  *B01D 67/00* (2006.01)
  *B01D 69/12* (2006.01)
  *B01D 71/02* (2006.01)
  *B01D 71/26* (2006.01)

(52) U.S. Cl.
  CPC ..... *B01D 67/0046* (2013.01); *B01D 67/0079* (2013.01); *B01D 69/12* (2013.01); *B01D 71/025* (2013.01); *B01D 71/26* (2013.01); *B01D 2325/12* (2013.01)

(56) References Cited

U.S. PATENT DOCUMENTS

| | | | |
|---|---|---|---|
| 2014/0283839 A1* | 9/2014 | Wickham | B01D 53/228 128/205.27 |
| 2014/0377156 A1* | 12/2014 | Okada | B01D 53/228 252/184 |
| 2015/0165390 A1 | 6/2015 | Hiranabe et al. | |

FOREIGN PATENT DOCUMENTS

| | | |
|---|---|---|
| JP | 2010-214324 A | 9/2010 |
| JP | 2015-160159 A | 9/2015 |
| WO | WO 2013/118776 A1 | 8/2013 |

OTHER PUBLICATIONS

Dai et al., "Combination of ionic liquids with membrane technology: A new approach for $CO_2$ separation," Journal of Membrane Science (2016), vol. 497, pp. 1-20.
Extended European Search Report dated Feb. 10, 2021, in European Patent Application No. 18802639.7.
Karousos et al, "Nanoporous ceramic supported ionic liquid membranes for $CO_2$ and $SO_2$ removal from flue gas," Chemical Engineering Journal (2017), vol. 313, pp. 777-790.
Rynkowska et al., "Application on polymer-based membranes containing ionic liquids in membrane separation processes: a critical review," Rev. Chem. Eng. (2018), vol. 34, No. 3, pp. 341-363.
Tzialla et al., "Phase behavior and permeability of Alkyl-Methyl-Imidazolium Tricyanomethanide ionic liquids supported in nanoporous membranes," Separation and Purification Technology (2014), vol. 135, pp. 22-34.
Chinese Office Action and Search Report for Chinese Application No. 201880032904.9, dated Jul. 28, 2021, with English translation.
International Search Report (PCT/ISA/210) issued in PCT/JP2018/017121, dated Jul. 3, 2018.
Written Opinion of the International Searching Authority (PCT/ISA/237) issued in PCT/JP2018/017121, dated Jul. 3, 2018.
English translation of International Preliminary Report on Patentability and Written Opinion dated Nov. 28, 2019, in PCT/JP2018/017121 (Forms PCT/IB/338, PCT/IB/373, and PCT/ISA/237).

* cited by examiner

CARBON DIOXIDE SEPARATION MEMBRANE AND METHOD FOR PRODUCING SAME

TECHNICAL FIELD

The present invention relates to a carbon dioxide separation membrane suitable for carbon dioxide fertilization in the agricultural field, a method of producing thereof, and a carbon dioxide concentrating device including the carbon dioxide separation membrane.

BACKGROUND ART

In agricultural or horticultural facilities (for example, greenhouses, vinyl houses, and plant factories), photosynthesis of plants becomes active in a time period during a day, in which a large amount of solar radiation is available, and thus a concentration of carbon dioxide (carbon dioxide gas or $CO_2$) in the facilities tends to decrease. In a case where the concentration of the carbon dioxide in the facility is continuously low, the plants may not be able to undergo photosynthesis sufficiently, and, consequently, growth of plants may be inhibited or a growth rate of plants may be reduced. For this reason, the carbon dioxide is fertilized for the purpose of promoting the growth of plants and improving yield.

As a method of fertilizing carbon dioxide, for example, a method of supplying carbon dioxide by a gas cylinder, a method of supplying carbon dioxide generated by burning fuel (for example, kerosene, and propane gas) are known. However, in the supplying the carbon dioxide by the gas cylinder, it is necessary to frequently replace a cylinder filled with a high-pressure gas, which makes the replacement work complicated and is not preferable from the viewpoint of safety. In addition, in the method of using combustion of fuel, the temperature in the facility is likely to rise due to waste heat, and thus applicable plants may be limited and ventilation or air conditioning equipment may be required separately. The use of fossil fuel is also not preferable from the viewpoint of reducing burden on the environment.

All of the above methods have high running costs and may not be profitable depending on the type of plants. Therefore, a method of concentrating and supplying carbon dioxide in the atmosphere with an adsorbent without using the gas cylinder or the fuel has been studied. For example, JP 2014-75994 A (Patent Document 1) discloses a $CO_2$ gas concentrating device, which includes two predetermined pressure vessels, an air compressor, as a device for supplying a $CO_2$ gas to a plant factory, a horticultural greenhouse, or the like. This document describes that zeolite, alumina, activated carbon can be used as the adsorbent. However, since the device requires two pressure vessels for the concentration of the carbon dioxide, it may difficult to reduce the size of the device and difficult to install the device depending on the facility. In addition, processes are complicated, because a process of adsorbing carbon dioxide into an adsorbent and concentrating the carbon dioxide and a process of desorbing the concentrated carbon dioxide from the adsorbent are required. In particular, the device cannot be operated smoothly immediately after the start of the operation.

On the other hand, the excellent gas absorption characteristics of an ionic liquid have attracted attention. In recent years, the development of gas separation and recovery (or removal) methods using the characteristics has been underway.

For example, JP 2016-10760 A (Patent Document 2) discloses that the ionic liquid using aminium as a cation, the aminium having a primary or secondary amino group and having a specific skeleton, can be used as an acidic gas chemical absorption liquid. In the embodiment of this document, a device configured to introduce carbon dioxide into an acidic gas chemical absorbing liquid housed in a reaction vessel 12 using a gas introduction pipe 16 is disclosed.

However, since the ionic liquid is used in a liquid state, the ionic liquid is difficult to handle, and the assembly or installation operation of the device is likely to be complicated.

In addition, JP 2015-124264 A (Patent Document 3) discloses a gel-like thin film which contains a polymer obtained by an ene-thiol reaction of a polyfunctional thiol compound having a polyethylene glycol skeleton and a polyfunctional vinyl compound having a polyethylene glycol skeleton and a liquid such as the ionic liquid. Patent Document 3 discloses that the gel-like thin film has a high liquid content, high strength, and high pressure resistance, and can be used as a gas separation membrane having excellent gas permeability. And the document also discloses that the gel-like thin film may be coated on a porous membrane to form a composite membrane and thus the thickness can be reduced. In the examples of this document, the gel-like thin film is prepared, in which the liquid such as the ionic liquid is included in the polymer obtained by reacting the tetrafunctional thiol compound with the tetrafunctional vinyl compound. In particular, in Examples 6 and 7, the composite membrane in which the gel-like thin film is formed on a polysulfone layer is prepared.

Since the gel-like thin film can keep the ionic liquid as a gel, the gel-like thin film is more easily handled than the liquid form (for example, a liquid film). However, when a user manually handles the gel-like thin film, the user may experience stickiness due to liquids on his/her hands. And thus, the handling of the gel-like thin film may not be sufficiently easy and an increase in a viscosity due to gelation may limit the improvement in gas permeability. In addition, since the compound for preparing the polymer also has a high viscosity and has poor handling property and is difficult to form a thin coating stably or efficiently, it is difficult to improve the gas permeability (permeation rate) by reducing the film thickness. Furthermore, even if the film thickness of the polymer can be adjusted to be thin, since the liquid is impregnated and gelled, not only the film thickness inevitably increases due to swelling but also the dimensional stability is poor. For this reason, the usage applications may be limited.

JP 2001-120940 A (Patent Document 4) discloses a method of separating and removing a carbon dioxide gas using a membrane in which a non-gelling porous membrane (A) into which a carbon dioxide gas carrier-liquid (C) having a combination of polyols and amines are impregnated and a hydrophobic porous membrane (B) having liquid repellency to the carrier-liquid (C) is laminated. In the embodiment of this document, a membrane in which a porous membrane made of hydrophilic polytetrafluoroethylene into which a mixed solution of triethylene glycol and diethylamine is impregnated and a porous membrane made of polyvinylidene fluoride are laminated is prepared. However, this document does not describe the ionic liquid at all.

In addition, Patent Documents 2 to 4 mainly describe industrial applications, for example, applications for separating and recovering (or removing) carbon dioxide from exhaust gas discharged from factories or from energy resources (for example, natural gas), but do not describe agricultural applications (fertilization applications) supplying concentrated carbon dioxide from the atmosphere to plants at all.

CITATION LIST

Patent Document

Patent Document 1: JP 2014-75994 A (Patent claims, FIG. 1 and [0048])
Patent Document 2: JP 2016-10760 A (claim 1, examples and FIG. 1 and [0130])
Patent Document 3: JP 2015-124264 A (Patent claims, examples and [0133])
Patent Document 4: JP 2001-120940 A (Patent claims, examples and [0013])

SUMMARY OF INVENTION

Technical Problem

Accordingly, an object of the present invention is to provide a carbon dioxide separation membrane, with which a size of a carbon dioxide concentrating device can be reduced and the carbon dioxide concentrating device can be operated smoothly, and a method for producing the same.

Another object of the present invention is to provide a carbon dioxide separation membrane which can be easily formed and can retain (or fix) an ionic liquid while maintaining the liquid state of the ionic liquid, and a method for producing the same.

Still another object of the present invention is to provide a carbon dioxide separation membrane excellent in handling property (or handling characteristics) even when the carbon dioxide separation membrane contains an ionic liquid, and a method for producing the same.

Yet another object of the present invention is to provide a carbon dioxide separation membrane, with which the thickness can be reduced easily and gas permeability (for example, permeation rate) can be improved efficiently, and a method for producing the same.

Solution to Problem

As a result of diligent studies to solve the above-mentioned problems, the present inventors have found that, in a laminate including an ionic liquid non-affinitive porous layer (B) which has no affinity to an ionic liquid and an ionic liquid affinitive porous layer (C) which has affinity to an ionic liquid, when an ionic liquid-containing liquid [or a liquid composition containing an ionic liquid] (A) is included (or retained) within voids in the ionic liquid affinitive porous layer (C), the laminate can be advantageously used as a carbon dioxide separation membrane (in particular, a carbon dioxide separation membrane for fertilization in the agricultural field), with which a size of a carbon dioxide concentrating device can be reduced and the carbon dioxide concentrating device can be operated smoothly, and thus completed the present invention.

That is, a carbon dioxide separation membrane [sometimes referred to as ionic liquid containing laminate (or IL-containing laminate)] according to an embodiment of the present invention includes an ionic liquid affinitive porous layer (C) [also referred to as IL affinitive porous layer (C)] having an ionic liquid-containing liquid (A) [referred to as an IL-containing liquid (A) or a liquid composition (A) containing an ionic liquid] retained within voids and an ionic liquid non-affinitive porous layer (B) [also referred to as an IL non-affinitive porous layer (B)].

The ionic liquid affinitive porous layer (C) [material (or formation component) constituting the ionic liquid affinitive porous layer (C)] may contain inorganic materials, for example, metal oxide particles having an average particle diameter from about 0.001 to 5 μm on a number basis. An average thickness of the ionic liquid affinitive porous layer (C) may be about from 0.01 to 10 sm.

The ionic liquid-containing liquid (A) contains the ionic liquid, and the ionic liquid may include a cation selected from ammoniums, imidazoliums, and phosphoniums, and an anion selected from a fluorine-containing anion, a cyano group-containing anion, and an anion derived from an amino acid.

The IL affinitive porous layer (C) may contain the ionic liquid-containing liquid (A) in a proportion from 0.1 to 99 parts by volume with respect to 100 parts by volume of voids therein. An equivalent film thickness (film thickness of a liquid film which is formed of a liquid having the same amount as the ionic liquid-containing liquid (A) retained in the carbon dioxide separation membrane and has the same area as the carbon dioxide separation membrane) of the ionic liquid-containing liquid (A) may be about from 0.1 to 2 μm.

The ionic liquid non-affinitive porous layer (B) [material (or formation component) constituting the ionic liquid non-affinitive porous layer (B)] may include at least one resin selected from polyolefin-based resins, fluororesins, and cellulose derivatives, and a contact angle of the ionic liquid non-affinitive porous layer (B) with respect to the ionic liquid-containing liquid (A) is about 900 or greater (for example, from 90 to 150°).

The ionic liquid-containing liquid (A) may further contain a second liquid (for example, a transportation accelerator) which is miscible with the ionic liquid. The second liquid may be polyamines. In the ionic liquid-containing liquid (A), the ratio between the ionic liquid and the second liquid, (the ionic liquid)/(the second liquid) (molar ratio), may be, for example, about from 25/75 to 75/25.

The carbon dioxide separation membrane according to an embodiment of the present invention may be the carbon dioxide separation membrane for fertilizing plants with carbon dioxide. The plant may be a plant cultivated indoors.

The present invention includes the method for producing a carbon dioxide separation membrane including: impregnating a liquid containing the ionic liquid-containing liquid (A) within the voids in the ionic liquid affinitive porous layer (C) in a laminate including the ionic liquid non-affinitive porous layer (B) and the ionic liquid affinitive porous layer (C).

In addition, the present invention also includes a carbon dioxide concentrating device having the carbon dioxide separation membrane.

In the present specification and claims, the affinity and non-affinity of the ionic liquid non-affinitive porous layer (B) and the ionic liquid affinitive porous layer (C) can be evaluated by the contact angle of the two porous layers with respect to the ionic liquid. That is, between the two porous layers above, the layer having the relatively larger contact angle with respect to the ionic liquid [or ionic liquid-containing liquid (A)] included in the carbon dioxide separation membrane is the ionic liquid non-affinitive porous layer (B), and the layer having the relatively smaller contact angle with respect to the ionic liquid contained in the carbon dioxide separation membrane is the ionic liquid affinitive porous layer (C). In addition, the contact angle can be measured by a known method, such as a method in which a liquid droplet is deposited onto a porous layer and observed from a side by a CCD camera or the like, under the environment of temperature of 27° C., humidity of 55% RH, and an atmospheric pressure (1 atm: 101.3 kPa), and then the observed image immediately after the droplet deposition (e.g., after 1 second) is analyzed.

Advantageous Effects of Invention

The carbon dioxide separation membrane according to an embodiment of the present invention includes the ionic liquid non-affinitive porous layer (B), the ionic liquid affinitive porous layer (C), and the ionic liquid-containing liquid (A) included within voids in the ionic liquid affinitive porous layer (C), and thus the carbon dioxide concentrating device can be reduced in its size and can be operated smoothly. Further, the carbon dioxide separation membrane can be easily formed and can retain (or fix) the ionic liquid while maintaining the liquid state of the ionic liquid (without increasing the viscosity due to gelation or the like). Therefore, even if the carbon dioxide separation membrane contains the ionic liquid, the stickiness on the surface can be suppressed and it is excellent in handling property (or handling characteristics). In addition, the thickness of the carbon dioxide separation membrane according to an embodiment of the present invention can be reduced easily, and thus the gas permeability (for example, permeation rate) can be improved efficiently.

DESCRIPTION OF EMBODIMENTS

Figure 1:
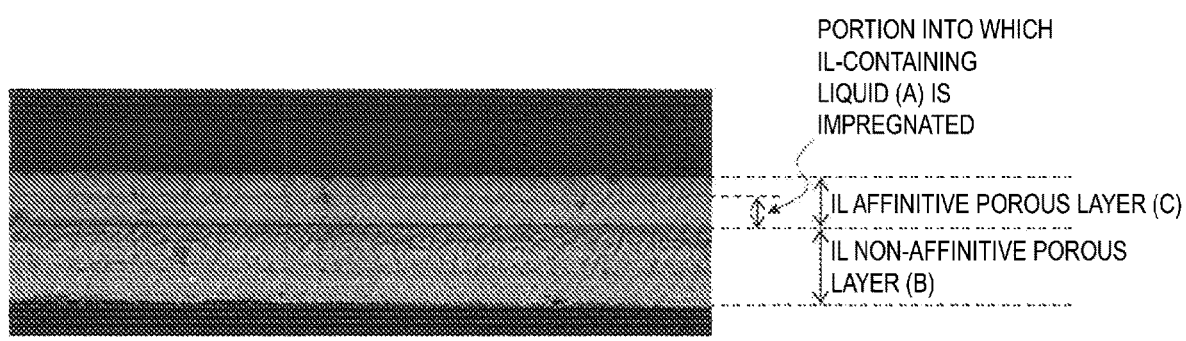
FIG. 1 is a cross-sectional observation image of a carbon dioxide separation membrane prepared in Example 23.

A carbon dioxide separation membrane (IL-containing laminate) according to an embodiment of the present invention includes an ionic liquid affinitive porous layer (C) having an ionic liquid-containing liquid (A) retained within voids therein, and an ionic liquid non-affinitive porous layer (B).

Ionic Liquid-Containing Liquid (A)

The ionic liquid-containing liquid (A) contains at least an ionic liquid. The ionic liquid [or room temperature molten salt] includes a cation (positive ion) and an anion (negative ion) (for example, 50 wt. % or greater, preferably 80 wt. % or greater, more preferably 90 wt. % or greater, and usually and substantially about 100 wt. %) as a main component, and may be of a liquid form under normal temperature and normal pressure (for example, about 100° C. or less and about 1 atm).

Cation

Examples of the cation usually include monovalent organic cations such as ammoniums, imidazoliums, pyridiniums, pyrrolidiniums, piperidiniums, phosphoniums, or sulfoniums.

Examples of the ammoniums include tetraalkylammonium [for example, tri $C_{1-6}$ alkyl-$C_{2-10}$ alkyl ammonium such as trimethyl-n-propylammonium ($[N_{113}]^+$), n-butyl-trimethylammonium ($[N_{1114}]^+$), n-hexyl-trimethylammonium ($[N_{1116}]^+$), triethyl-methylammonium ($[N_{2221}]^+$), tetraethylammonium ($[N_{2222}]^+$), n-butyl-triethylammonium ($[N_{2224}]^+$), or tetra-n-butylammonium ($[N_{4444}]^+$)]; ammonium having a functional group [for example, ammonium having a hydroxyl group such as 2-hydroxyethyl-trimethyl-ammonium ($[choline]^+$); and ammonium having an ether group such as 2-methoxyethyl-diethyl-methyl ammonium ($[N_{221(2O1)}]^+$)].

Examples of the imidazoliums include 1,3-dialkylimidazolium [for example, 1-$C_{2-10}$ alkyl-3-$C_{1-3}$ alkyl-imidazolium such as 1-ethyl-3-methylimidazolium ($[emim]^+$), 1-n-butyl-3-methylimidazolium ($[bmim]^+$), 1-n-hexyl-3-methylimidazolium ($[hmim]^+$), and 1-n-octyl-3-methylimidazolium ($[omim]^+$)]; imidazolium having a functional group [for example, imidazolium having an alkyl fluoride group such as 1-methyl-3-nonafluorohexylimidazolium ($[C_6H_4F_9mim]^+$) and 1-methyl-3-tridecafluorooctyl-imidazolium ($[C_8H_4F_{13}mim]^+$); and imidazolium having an amino group such as 1-(3-aminopropyl)-3-butylimidazolium ($[C_3H_6NH_2bim]^+$)].

Examples of the pyridiniums include N-alkylpyridinium [for example, N—$C_{2-6}$ alkyl-pyridinium such as N-ethylpyridinium ($[C_2py]^+$) and N-butylpyridinium ($[C_4py]^+$)].

Examples of the pyrrolidiniums include N,N-dialkylpyrrolidinium [for example, N—$C_{1-3}$ alkyl-N—$C_{2-6}$ alkyl-pyrrolidinium such as N-methyl-N-propylpyrrolidinium ($[Pyr_{13}]^+$) and N-butyl-N-methylpyrrolidinium ($[Pyr_{14}]^+$)].

Examples of the piperidiniums include N,N-dialkylpiperidinium [for example, N—$C_{1-10}$ alkyl-N—$C_{2-6}$ alkyl-piperidinium such as N-methyl-N-propylpiperidinium ($[Pip_{13}]^+$) and N-butyl-N-methylpiperidinium ($[PiP_{14}]^+$)].

Examples of the phosphoniums include tetraalkylphosphonium [for example, tri $C_{1-10}$ alkyl-$C_{2-20}$ alkylphosphonium such as triethyl-pentylphosphonium ($[P_{2225}]^+$), tetrabutylphosphonium ($[P_{4444}]^+$), and trihexyl-tetradecylphosphonium ($[P_{666(14)}]^+$)].

Examples of the sulfoniums include trialkylsulfonium (for example, tri-$C_{2-6}$ alkylsulfonium such as triethylsulfonium).

These cations can be used alone or two or more types can be used in combination. Of these cations, ammoniums, imidazoliums, and phosphoniums (for example, imidazoliums, phosphoniums, and preferably phosphoniums) may be used typically, and in particular, 1,3-dialkylimidazolium (for example, 1-$C_{2-8}$ alkyl-3-$C_{1-2}$ alkylimidazolium such as $[emim]^+$), tetraalkylphosphonium (for example, tri-$C_{1-8}$ alkyl-$C_{3-18}$ alkylphosphonium such as $[P_{4444}]^+$) may be usually used.

Anion

Examples of the anion typically includes a monovalent anion, for example, a fluorine-containing anion, a cyano group-containing anion, halogen ion (for example, chloride ion ($[Cl]^-$), bromide ion ($[Br]^-$), iodide ion ($[I]^-$)), alkyl sulfonate ion [for example, $C_{1-6}$ alkyl sulfonate ions such as methanesulfonate ion ($[CH_3SO_3]^-$), alkylcarboxylate ion [for example, $C_{1-6}$ alkyl-carboxylate ions such as acetate ion $[CH_3COO]^-$)], sulfate ion [for example, $C_{1-6}$ alkyl sulfate ions such as methyl sulfate ion ($[CH_3SO_4]^-$) or ethyl sulfate ion ($[EtSO_4]^-$), hydroxysulfate ion ($[HSO_4]^-$),], nitrate ion ($[NO_3]^-$), and an anion derived from an amino acid.

Examples of the fluorine-containing anion include an anion having a sulfonyl group such as triflate ion ($[CF_3SO_3]^-$ or $[TfO]^-$), bis (fluorosulfonyl) amide ion ($[(FSO_2)_2N]^-$ or $[FSA]^-$), bis (trifluoromethanesulfonyl) amide ion ($[(CF_3SO_2)_2N]^-$, $[Tf_2N]^-$ or $[TFSA]^-$) [also referred to as bis (trifluoromethanesulfonyl) imide ion ($[TFSI]^-$)], and tris (trifluoromethanesulfonyl) methide ion ($[(CF_3SO_2)_3C]^-$ or $[Tf_3C]^-$); an anion having boron such as tetrafluoroborate ion ($[BF_4]^-$), trifluoromethyl-trifluoroborate ion ($[CF_3BF_3]^-$); an anion having phosphorous such as hexafluorophosphate ion ($[PF_6]^-$) or tris (pentafluoroethyl)

trifluorophosphate ion ($[FAP]^-$); and fluorinated alkyl carboxylate ion such as trifluoroacetate ion ($[CF_3COO]^+$ or $[TFA]^-$).

Examples of the cyano group-containing anion include dicyanamide ion ($[N(CN)_2]^-$ or $[DCA]^-$), tricyanomethide ion ($[C(CN)_3]^-$), and tetracyanoborate ion ($[B(CN)_4]^-$).

Examples of the anion derived from an amino acid include carboxylate ions which correspond to glycine (Gly), alanine (Ala), β-alanine (β-Ala), valine (Val), leucine (Leu), isoleucine (Ile), phenylalanine (Phe), serine (Ser), threonine (Thr), tyrosine (Tyr), cysteine (Cys), methionine (Met), asparagine (Asn), glutamine (Gln), aspartic acid (Asp), glutamic acid (Glu), lysine (Lys), arginine (Arg), histidine (His), tryptophan (Trp), and proline (Pro)

These anions can be used alone or two or more types can be used in combination. Of these anions, a fluorine-containing anion (for example, an anion having a sulfonyl group such as $[TFSA]^-$), a cyano group-containing anion (for example, $[DCA]^-$), an anion derived from an amino acid (for example, proline-derived anion $[Pro]^-$), and an anion derived from glycerin ($[Gly]^-$) may be used typically, and in particular, an anion derived from an amino acid such as $[Pro]^-$ may be usually used.

Representative examples of the ionic liquid include an ionic liquid which contains a cation selected from ammoniums, imidazoliums, and phosphoniums, and an anion selected from a fluorine-containing anion, a cyano group-containing anion, and an anion derived from an amino acid. Specifically, examples of the ionic liquid include an ionic liquid in which the ammoniums and the fluorine-containing anion are combined (for example, $[N_{114}]$ [TFSA], [choline] [TFSA]); an ionic liquid in which the imidazoliums and the fluorine-containing anion are combined (for example, [emim] [TFSA], [emim][TfO], [emim] [$BF_4$], [bmim] [TFSA], [bmim] [$Tf_3C$], [bmim] [TfO], [bmim][$BF_4$], [bmim] [$PF_6$], [bmim] [TFA], [hmim] [TFSA], [omim] [TFSA], [$C_6H_4F_9$mim] [TFSA]); an ionic liquid in which the imidazoliums and the cyano group-containing anion are combined (for example, [emim] [DCA], [emim][$C(CN)_3$], [emim] [$B(CN)_4$], [bmim] [DCA], [bmim] [$C(CN)_3$], [bmim][$B(CN)_4$]); and an ionic liquid in which the phosphoniums and the anion derived from an amino acid are combined (for example, [$P_{444}4$] [Pro], [$P_{2225}$] [Pro], [$P_{2225}$] [Gly]).

These ionic liquids may be used alone or two or more types may be used in combination as long as they are miscible. Among these ionic liquids, the ionic liquid in which the imidazoliums and the fluorine-containing anion are combined (for example, an ionic liquid in which 1,3-dialkylimidazolium and a fluorine-containing anion having a sulfonyl group are combined, and preferably an ionic liquid in which 1-$C_{2-6}$ alkyl-3-$C_{1-2}$ alkylimidazoliums and the fluorine-containing anion having a sulfonyl group are combined such as [emim][TFSA]); the ionic liquid in which the imidazoliums and the anion containing a cyano group are combined (for example, an ionic liquid in which 1,3-dialkylimidazolium and a cyano group-containing anion are combined, and preferably an ionic liquid in which 1-$C_{2-6}$ alkyl-3-$C_{1-2}$ alkylimidazoliums and the anion containing a cyano group are combined, such as [emim] [DCA]); the ionic liquid in which phosphoniums and the anion derived from an amino acid are combined (for example, an ionic liquid in which tetraalkylphosphonium and an anion derived from an amino acid are combined, and preferably an ionic liquid in which tri $C_{1-8}$ alkyl-$C_{3-18}$ alkylphosphonium and proline or glycine-derived anion are combined, such as [$P_{4444}$] [Pro]) are preferably used, and in particular, the ionic liquid in which tri-$C_{2-6}$ alkyl-$C_{4-16}$ alkylphosphonium and the proline-derived anion are combined, such as [$P_{4444}$] [Pro], is preferably used.

In addition, the ionic liquid-containing liquid (A) may or may not contain another liquid (or second liquid) besides the ionic liquid, together with the ionic liquid. The second liquid is not particularly limited as long as it is miscible with the ionic liquid, and is often a liquid having relatively low volatility. Examples of the second liquid include transportation accelerators, for example, amines such as amines having a hydroxyl group (for example, mono to tri $C_{2-6}$ alkanolamines such as monoethanolamine, diethanolamine, triethanolamine, and diisopropanolamine) and polyamines [for example, (poly) $C_{2-6}$ alkylene polyamines such as (poly) ethylene polyamine (for example, ethylenediamine, diethylenetriamine, and triethylenetetramine)].

These second liquids (for example, transportation accelerators) can be used alone or two or more types can be used in combination. Of these second liquids (for example, transportation accelerators), polyamines such as (poly) $C_{2-6}$ alkylene polyamine, and in particular, (poly) $C_{2-4}$ alkylene polyamine such as triethylenetetramine are preferred. In a case where the ionic liquid-containing liquid includes amines as the second liquid (for example, polyamines such as triethylenetetramine), a permeability coefficient (or permeation rate of carbon dioxide) in the carbon dioxide separation membrane may be unexpectedly improved.

The reason is not clear, but is presumed as follows. In general, an ionic liquid physically adsorbs carbon dioxide with a certain degree of selectivity, and thus the carbon dioxide tends to be easily desorbed (or permeated), whereas the transportation accelerator chemically interacts with the carbon dioxide, and the carbon dioxide can be adsorbed (or have improved separability) more selectively but tends not to be desorbed. Therefore, when the transportation accelerator is added to the ionic liquid, the decrease in the permeability coefficient (or permeation rate) of the carbon dioxide separation membrane is expected. However, amines and anions in the ionic liquid (in particular, anions derived from an amino acid such as proline anions ($[Pro]^-$)) have high affinity to each other (or they show good dispersed state), and it is presumed that this may relates to an interaction of the amines with carbon dioxide to the extent that the amines do not inhibit the permeation (or desorption) of the carbon dioxide. Therefore, it is considered that the permeability coefficient (or permeation rate) of the carbon dioxide separation membrane is improved.

The ratio of the ionic liquid can be selected from a range of, for example, about 10 wt. % or greater (for example, 30 wt. % or greater), for example, 50 wt. % or greater, preferably 70 wt. % or greater, more preferably 90 wt. % or greater, and substantially about 100 wt. %, with respect to the entire ionic liquid-containing liquid (A).

When the ionic liquid-containing liquid (A) contains the second liquid, the ratio of the ionic liquid and the second liquid (for example, amines), (ionic liquid)/(second liquid) (molar ratio), can be selected, for example, from the range from 1/99 to 99/1, for example, from 10/90 to 90/10 (for example, from 20/80 to 80/20), preferably from 25/75 to 75/25 (for example, from 30/70 to 70/30), and more preferably about from 40/60 to 60/40 (for example, from 45/55 to 55/45). In a case where the ratio of the ionic liquid is too small, the carbon dioxide may not be separated (or permeated) efficiently.

IL Non-Affinitive Porous Layer (B) (or First Porous Layer (B))

The IL non-affinitive porous layer (B) has a large number of pores (micropores or voids) therein, and a surface of the pores (which may include the surface (or wall surface) within voids in the IL non-affinitive porous layer (B)) thereof may be usually hydrophobic (relatively hydrophobic with respect to the IL affinitive porous layer (C)). In addition, the void may include or may not include an independent hole, but includes at least a communication pore (or a through hole) that communicates through the thickness direction. The IL non-affinitive porous layer (B) [material constituting the IL non-affinitive porous layer (B) or formation component of the IL non-affinitive porous layer (B)] may include a resin (for example, thermoplastic resin) as a main component [for example, at a ratio of 50 wt. % or greater, preferably 70 wt. % or greater, and more preferably 90 wt. % or greater (substantially about 100 wt. %) with respect to the entire IL non-affinitive porous layer (B)]. From the viewpoint of excellent ease of formation, the IL non-affinitive porous layer (B) may be usually a porous membrane (porous membrane, porosity membrane, or microporous membrane) made of a thermoplastic resin.

Examples of the thermoplastic resin include a polyolefin-based resin, a polyester-based resin (for example, polyalkylene arylate resins such as polyethylene terephthalate, polybutylene terephthalate, and polyethylene naphthalate), polycarbonate-based resin (for example, bisphenol type polycarbonate resins such as bisphenol A type polycarbonate resin, bisphenol F type polycarbonate resin, and bisphenol S type polycarbonate resin), a polyamide-based resin (for example, aliphatic polyamide resins such as polyamide 6 and polyamide 66), a polysulfone-based resin (for example, polysulfone, polyethersulfone), a fluororesin, cellulose derivatives.

These thermoplastic resins can be used alone or two or more types can be used in combination. These thermoplastic resins may usually contain at least one resin selected from a polyolefin-based resin, a fluororesin, and cellulose derivatives (for example, polyolefin-based resin and fluororesin).

Examples of the polyolefin-based resin include a polyethylene-based resin, a polypropylene-based resin, and a polymethylpentene-based resin (for example, poly-4-methyl-1-pentene resin). These polyolefin-based resins can be used alone or two or more types can be used in combination. Of the polyolefin-based resins, the polyethylene-based resin and the polypropylene-based resin (in particular, polyethylene-based resin) may be usually used.

The polyethylene-based resin may be an ethylene homopolymer or an ethylene copolymer.

In a case of the copolymer, examples of the monomer, which is copolymerizable (copolymerizable monomer), with ethylene include α-olefins (for example, α-$C_{3-20}$ olefins such as propylene, 1-butene, 1-pentene, 3-methyl-1-butene, 1-hexene, 2-methyl-1-pentene, 3-methyl-1-pentene, 4-methyl-1-pentene, 4,4-dimethyl-1-pentene, 3-ethyl-1-pentene, 4-methyl-1-hexene, 1-octene, 4,4-dimethyl-1-hexene, 3-ethyl-1-hexene, 4-ethyl-1-hexene, 1-nonene, 1-decene, 1-undecene, 1-dodecene, 1-tetradecene, 1-hexadecene, 1-octadecene, and 1-eicosene), alkadienes (for example, non-conjugated alkadienes such as 1,4-hexadiene, 1,7-octadiene, 4-methyl-1,4-hexadiene, and 5-methyl-1,4-hexadiene, and conjugated alkadienes such as butadiene and isoprene,), ethylenically unsaturated carboxylic acids and acid anhydrides thereof [for example, (meth)acrylic acid, maleic acid, fumaric acid, itaconic acid, citraconic acid, crotonic acid, isocrotonic acid, mesaconic acid, and angelic acid], (meth)acrylic acid ester [(meth)acrylic acid alkyl ester, and glycidyl (meth)acrylate], and carboxylic acid vinyl ester (saturated carboxylic acid vinyl esters such as vinyl acetate, and vinyl propionate). These copolymerizable monomers can be used alone or two or more types can be used in combination. Among these monomers, α-$C_{3-10}$ olefins such as propylene, 1-butene, 1-hexene, 1-octene, and 4-methyl-1-pentene are widely used.

Examples of the form of the copolymer include block copolymerization, random copolymerization, alternating copolymerization, and graft copolymerization, and the random copolymerization and the alternating copolymerization may be usually used. In the polyethylene-based resin, the ratio of ethylene (ethylene unit) and copolymerizable monomer (copolymerizable monomer unit), (ethylene/copolymerizable monomer) (molar ratio), is, for example, from 50/50 to 100/0, preferably from 60/40 to 99/1, more preferably about from 65/35 to 95/5 (for example, from 70/30 to 90/10).

Examples of the polyethylene-based resin include low density polyethylene (LDPE), medium density polyethylene, high density polyethylene (HDPE), and linear low density polyethylene (LLDPE). In addition, the polyethylene-based resin may be a polymer formed using a Ziegler catalyst, but may be a metallocene-based resin formed using a metallocene catalyst from the viewpoint of obtaining a polymer having a narrow molecular weight distribution. These polyethylene-based resins can be used alone or two or more types can be used in combination.

The polypropylene-based resin may be a propylene homopolymer or a propylene copolymer.

Examples of the monomer copolymerizable with propylene (copolymerizable monomer) in the copolymer include ethylene and copolymerizable monomers (however, excluding propylene) exemplified in a section of the above-mentioned polyethylene-based resin. These monomers can be used alone or two or more types can be used in combination. Among these monomers, α-$C_{2-6}$ olefins such as ethylene and 1-butene are widely used. Examples of the form of the copolymer include block copolymerization, random copolymerization, alternating copolymerization, and graft copolymerization, and the random copolymerization and the alternating copolymerization may be usually used. In the polypropylene-based resin, the ratio of the propylene (propylene unit) and the copolymerizable monomer (copolymerizable monomer unit), (propylene/copolymerizable monomer)(molar ratio), may be, for example, from 90/10 to 100/0, preferably from 95/5 to 100/0, more preferably about from 99/1 to 100/0.

The polypropylene-based resin may be atactic, but from the viewpoint of improving heat resistance, a structure having tacticity such as isotactic and syndiotactic is preferable, and an isotactic polymer may be used. In addition, the polypropylene-based resin may be a polymer formed using a Ziegler catalyst or the like, but may be a metallocene-based resin formed using a metallocene catalyst from the viewpoint of obtaining a polymer having a narrow molecular weight distribution. These polypropylene-based resins can be used alone or two or more types can be used in combination.

Examples of the fluororesin include polytetrafluoroethylene (PTFE), polyvinylidene fluoride (PVDF), polyvinyl fluoride (PVF), polychlorotrifluoroethylene (PCTFE), and tetrafluoroethylene copolymer [for example, tetrafluoro ethylene-hexafluoropropylene copolymer (PFEP), tetrafluoroethylene-perfluoroalkylvinyl ether copolymer (PFA), and ethylene-tetrafluoroethylene copolymer (PETFE)].

These fluororesins can be used alone or two or more types can be used in combination. Of these fluororesins, PTFE and solvent-soluble fluororesins (for example, PVDF), may be usually used.

Examples of the cellulose derivatives include cellulose esters, cellulose carbamates, and cellulose ethers. These cellulose derivatives can be used alone or two or more types can be used in combination. Of the cellulose derivatives, cellulose esters may be usually used.

Examples of the cellulose esters include cellulose organic acid ester, cellulose organic acid ester-ether, cellulose inorganic acid ester, and cellulose organic acid and inorganic acid mixed ester.

Examples of the cellulose organic acid ester include cellulose acylate [cellulose acetates such as cellulose diacetate (DAC) and cellulose triacetate (TAC); cellulose $C_{3-6}$ acylates such as cellulose propionate and cellulose butyrate; and cellulose acetate-$C_{3-6}$ acylates such as cellulose acetate propionate (CAP) and cellulose acetate butyrate (CAB)], and aromatic organic acid esters (cellulose $C_{7-12}$ aromatic carboxylic acid esters such as cellulose phthalate and cellulose benzoate).

Examples of the cellulose organic acid ester-ether include $C_{2-6}$ acyl cellulose $C_{1-6}$ alkyl ethers such as acetyl methyl cellulose, acetyl ethyl cellulose, and acetyl propyl cellulose; $C_{2-6}$ acyl cellulose hydroxy $C_{2-6}$ alkyl ether such as acetyl hydroxyethyl cellulose and acetyl hydroxypropyl cellulose.

Examples of the cellulose inorganic acid ester include cellulose nitrate, cellulose sulfate, and cellulose phosphate.

Examples of the cellulose organic acid and inorganic acid mixed ester include cellulose nitrate acetate.

These cellulose esters can be used alone or two or more types can be used in combination. Among these cellulose esters, cellulose organic acid esters such as cellulose acetate, cellulose inorganic acid esters such as cellulose nitrate, and in particular, cellulose acylates such as TAC may be usually used.

Of these thermoplastic resins, a polyolefin-based resin, a fluororesin, and cellulose derivatives (in particular, polyolefin-based resin, fluororesin, polyolefin-based resin from the viewpoint of easy availability) are preferred, and in particular, poly α-$C_{2-3}$ olefin resins such as a polyethylene-based resin and a polypropylene-based resin (in particular, polyethylene-based resin) and fluororesins such as PTFE and PVDF (in particular, PVDF) are preferred.

These thermoplastic resins may contain the known additives. Examples of the known additives include stabilizers such as a heat stabilizer, an antioxidant, and an ultraviolet absorber, a preservative, a bactericide, a plasticizer, a lubricant, a colorant, a viscosity modifier, a leveling agent, a surfactant, and an antistatic agent. These additives can be used alone or two or more types can be used in combination. The ratio of the additive is, for example, 50 parts by weight or less, preferably 30 parts by weight or less (for example, 0.01 to 30 parts by weight), and more preferably about 10 parts by weight or less (for example, from 0.1 to 10 parts by weight) with respect to 100 parts by weight of resin.

The method for preparing a porous membrane of such a thermoplastic resin is not particularly limited, and the porous membrane is prepared by the known methods, such as a method in which a phase separation of a resin solution is used, a method in which a resin film is subjected to a stretching process, and a method in which high energy-rays such as α rays are irradiated to a resin film.

In addition, the IL non-affinitive porous layer (B) may be subjected to the known surface treatment (for example, treatment described in JP 06-9810 A, that is, treatment of attaching a cross-linked product derived from an ethylenically unsaturated monomer having a fluorinated alkyl group) in order to adjust wettability (or contact angle) with respect to the ionic liquid-containing liquid (A).

As the IL non-affinitive porous layer (B), a commercially available product may be used. For example, "C-pore" available from Ube Maxell Co., Ltd., "U-Pore" available from Ube Industries, Ltd., or "Durapel" available from Merck Millipore, may be used.

The average thickness of the IL non-affinitive porous layer (B) may be, for example, about from 1 to 200 μm, preferably from 10 to 150 μm, and more preferably about from 15 to 130 μm.

A pore diameter (average pore diameter or average micropore pore diameter) of the IL non-affinitive porous layer (B) may be selected from a wide range of, for example, about from 0.001 to 10 μm (for example, from 0.01 to 5 μm), for example, from 0.001 to 1 μm (for example, from 0.005 to 0.5 μm), preferably from 0.01 to 0.4 μm (for example, from 0.03 to 0.35 μm), and more preferably about from 0.05 to 0.3 μm (for example, from 0.07 to 0.25 μm). In a case where the pore diameter is too small, the gas permeability may be reduced, and in a case where the pore diameter is too large, the ionic liquid-containing liquid (A) or the like may permeate through and may not be retained in the carbon dioxide separation membrane (IL-containing laminate). In the present specification and claims, the pore diameter (average pore diameter or average micropore diameter) can be measured by a known method such as the mercury porosimetry.

The porosity of the IL non-affinitive porous layer (B) is selected from a wide range, for example, from 1 to 90% (for example, from 10 to 80%) depending on the method for producing a porous layer, for example, from 20 to 85%, preferably from 30 to 80%, and more preferably about from 40 to 75%. In a case where the porosity is too small, the gas permeability may be reduced, and in a case where the porosity is too large, the ionic liquid-containing liquid (A) may permeate through and may not be retained in the carbon dioxide separation membrane (IL-containing laminate). In the present specification and claims, the porosity represents a volume ratio of voids in the porous layer with respect to the entire volume of any one of the porous layers [the entire volume of the IL non-affinitive porous layer (B) or the entire volume of the IL affinitive porous layer (C)], and can be measured by the method described in Examples described later.

The porosity of the communication pores of the IL non-affinitive porous layer (B) may be, for example, about 50% or greater, preferably about 70% or greater, and more preferably about 90% or greater (for example, substantially 100%). In the present specification and claims, the porosity of the communication pores represents the volume ratio of the communication pores to the voids of the porous layer, and may be determined from an image of a cross section observed by a scanning electron microscope (SEM) or the like.

The contact angle of the IL non-affinitive porous layer (B) with respect to the ionic liquid-containing liquid (A) (for example, ionic liquid) is, for example, 90° or greater (for example, from 90 to 150°), preferably 95 or greater (for example, from 95 to 148°), more preferably about 100° or greater (for example, from 100 to 145°). In a case where the contact angle is too small, the ionic liquid-containing liquid (A) may permeate through and cannot be retained in the IL non-affinitive porous layer (B). In the present specification and claims, the contact angle can be measured by the known method as described above.

IL Affinitive Porous Layer (C) (or Second Porous Layer (C))

The IL affinitive porous layer (C) has a large number of pores (micropores or voids) therein, and the surface thereof (which may include the surface (or wall surface) within voids in the IL non-affinitive porous layer (C)) may be usually hydrophilic (relatively hydrophilic with respect to the IL affinitive porous layer (B)). In addition, the void may include or may not include an independent hole, but includes at least a communication pore (or a through hole) that communicates through the thickness direction. The IL affinitive porous layer (C) [material constituting the IL affinitive porous layer (C) or formation component of the IL affinitive porous layer (C)] may include the organic material such as the resin described in the section of the IL non-affinitive porous layer (B) as the main component, but may include the inorganic material as the main component [for example, 50 wt. % or greater, preferably 70 wt. % or greater, and more preferably 90 wt. % or greater (substantially about 100 wt. %) with respect to the IL affinitive porous layer (C)] from the viewpoint of excellent ease of formation and mechanical properties. Therefore, the IL affinitive porous layer (C) may be those obtained by performing hydrophilic treatment on the resin described in a section of the above-mentioned IL non-affinitive porous layer (B) (for example, porous membrane made of hydrophilic PTFE, and porous membrane made of hydrophilic PVDF), but may be usually a porous membrane made of an inorganic material (porous membrane, porosity membrane, or a microporous membrane). In a case where the IL affinitive porous layer (C) is made of an inorganic material, the IL affinitive porous layer (C) can impart rigidity resulting from the inorganic material to the IL-containing laminate. Thus, a carbon dioxide separation membrane (IL-containing laminate) is easy to handle and the handling can be improved effectively even if the IL affinitive porous layer (C) is thin. In particular, the IL affinitive porous layer (C) preferably includes the inorganic materials such that the swelling or gelation that causes a decrease in gas permeability can be not only suppressed effectively, but the dimensional stability can also be improved.

Examples of the inorganic material usually include metal oxides such as Group 4A metal oxides (for example, titanium oxide, and zirconium oxide), Group 5A metal oxides (for example, vanadium oxide), Group 6A metal oxides (molybdenum oxide, and tungsten oxide), Group 7A metal oxides (manganese oxide), Group 8 metal oxides (nickel oxide, and iron oxide), Group 1B metal oxides (copper oxide), 2B Group metal oxides (zinc oxide), Group 3B metal oxides (aluminum oxide, and indium oxide), Group 4B metal oxides (silicon oxide, and tin oxide), Group 5B metal oxides (antimony oxide).

These metal oxides can be used alone or in combination of two or more. Among these metal oxides, from the viewpoint of the affinity (or hydrophilicity) with the ionic liquid-containing liquid (A), the ease of preparation of dispersion (or slurry) resulting from specific gravity, and furthermore, the availability, Group 3B metal oxides such as aluminum oxide and Group 4B metal oxides such as silicon oxide (in particular, Group 3B metal oxides such as aluminum oxide) are preferred.

The inorganic material (or metal oxide) may be of a particulate form. The average particle diameter of the inorganic material (or metal oxide) is, for example, from 0.001 to 10 μm (for example, from 0.01 to 5 μm), preferably from 0.1 to 3 μm (for example, from 0.3 to 2 μm), and more preferably about from 0.5 to 1.5 μm (for example, from 0.8 to 1.2 μm) on a number basis. In the present specification and claims, the average particle diameter can be measured by the method described in Examples below.

The shape of the particles is not particularly limited, and examples thereof include spherical (or substantially spherical), ellipsoidal, polyhedral (polygonal pyramid, squared parallelepiped, rectangular parallelepiped), plate, rod, and indeterminate. Typically, the shape is indeterminate. In addition, the inorganic material may or may not be surface-treated from the viewpoint of improving dispersibility.

When the IL affinitive porous layer (C) is prepared using a particulate inorganic material (or metal oxide), the gas permeability of the IL affinitive porous layer (C) itself can be adjusted to be high due to the gaps (voids) between the particles, so it is possible to effectively suppress the decrease in gas permeability even in a laminated structure. In addition, even when a user touches the surface of the carbon dioxide separation membrane (for example, the IL affinitive porous layer (C) side of the carbon dioxide separation membrane), the ionic liquid-containing liquid (A) included inside may not readily exude due to the rigidity of the IL affinitive porous layer (C), and thus the ionic liquid-containing liquid (A) can be easily retained stably in a liquid state, and the stickiness of the carbon dioxide separation membrane (IL-containing laminate) surface can be effectively suppressed.

In addition, the IL affinitive porous layer (C) may be subjected to a known surface treatment (for example, treatment using a silane coupling agent) for adjusting wettability (or contact angle) with respect to the ionic liquid-containing liquid (A) (for example, ionic liquid).

The average thickness of the IL affinitive porous layer (C) can be selected from the range, for example, about from 0.01 to 100 μm (for example, from 0.03 to 70 μm), for example, from 0.05 to 50 μm (for example, from 0.1 to 30 μm), preferably from 0.5 to 20 μm (for example, from 1 to 15 μm), and more preferably about from 1 to 10 μm (for example, from 2 to 7 μm). In a case where the average thickness is too large, the weight of the carbon dioxide separation membrane (IL-containing laminate) may increase.

The pore diameter (average pore diameter or average micropore diameter) of the IL affinitive porous layer (C) may be, for example, about from 0.001 to 10 μm (for example, from 0.01 to 5 μm). When the pore diameter is too small, not only the amount of ionic liquid-containing liquid (A) which can be retained may decrease, but also the gas permeability may decrease. When the IL affinitive porous layer (C) is made of an inorganic material (for example, metal oxide particles), the gas permeability is easily adjusted to be high.

The porosity of the IL affinitive porous layer (C) may be selected from a wide range about from 1 to 90% (for example, from 10 to 80%), for example, from 5 to 70% (for example, from 10 to 60%), preferably from 15 to 50% (for example, from 20 to 45%), and more preferably about from 25 to 40% (for example, from 30 to 35%). In a case where the porosity is too small, not only the amount of ionic liquid-containing liquid (A) which can be retained may decrease, but also the gas permeability may decrease. In a case where the porosity is too large, the ionic liquid-containing liquid (A) may not be stably retained.

The porosity of the communication pores of the IL affinitive porous layer (C) may be, for example, about 50% or greater, preferably about 70% or greater, and more preferably about 90% or greater (for example, substantially 100%).

The contact angle with respect to the ionic liquid-containing liquid (A) (for example, ionic liquid) of the IL affinitive porous layer (C) is, for example, less than 900 (for example, 0° or greater and less than 90°), preferably 85° or less (for example, 15 to 85°), and more preferably about 80° or less (for example, 30 to 80°). In a case where the contact angle is too large, it may be difficult to retain the ionic liquid-containing liquid (A).

The difference between the contact angles of the IL non-affinitive porous layer (B) and the IL affinitive porous layer (C) with respect to the ionic liquid-containing liquid (A) (or ionic liquid) is, for example, 100 or greater (for example, from 15 to 55°), preferably 200 or greater (for example, from 25 to 50°), and more preferably about 300 or greater (for example, from 30 to 45°). When the difference between the contact angles is too small, it may be difficult to stably retain the ionic liquid-containing liquid (A). Further, when the difference between the contact angles is too large, there is a possibility that the ionic liquid-containing liquid (A) does not spread in a flat shape (or surface direction) inside the IL affinitive porous layer when the basis weight of the ionic liquid-containing liquid (A) is small.

Carbon Dioxide Separation Membrane (IL-Containing Laminate) and Method for Producing the Same The carbon dioxide separation membrane (IL-containing laminate) according to an embodiment of the present invention may include impregnating a liquid (or impregnation liquid) containing the ionic liquid-containing liquid (A) into voids of the IL affinitive porous layer (C), in a laminate (IL-free laminate) including the IL non-affinitive porous layer (B) and the IL affinitive porous layer (C) (impregnating step).

The impregnation liquid may be composed only of the ionic liquid-containing liquid (A), and may be a mixed liquid (solution or dispersion) in which the ionic liquid-containing liquid (A) and a solvent (or dispersion medium) are mixed. From the viewpoint of easily reducing the equivalent film thickness of the ionic liquid-containing liquid (A), the impregnation liquid is preferably a mixed liquid. In the present specification and claims, the "equivalent film thickness" means a film thickness of the liquid film, when the liquid film is formed using the ionic liquid-containing liquid (A) included in the porous layer to have the same area as the carbon dioxide separation membrane (IL-containing laminate).

The solvent (or dispersion medium) is preferably a solvent having higher volatility than the ionic liquid-containing liquid (A), and examples thereof include water, alcohols (lower alcohols such as methanol, ethanol, isopropanol, butanol, and cyclohexanol), ketones (acetone, methyl ethyl ketone, methyl isobutyl ketone, and cyclohexanone), esters (methyl acetate, ethyl acetate, propyl acetate, butyl acetate, methyl formate, and ethyl formate), ethers (diethyl ether, dioxane, and tetrahydrofuran), aliphatic hydrocarbons (hexane), alicyclic hydrocarbons (cyclohexane), aromatic hydrocarbons (benzene), halogenated hydrocarbons (dichloromethane, and dichloroethane), cellosolves (methyl cellosolve, and ethyl cellosolve), cellosolve acetates, and amides (dimethylformamide, and dimethylacetamide). These solvents can be used alone or two or more types can be used in combination. Of these solvents, aqueous solvents (or water-soluble solvents) such as water and alcohols (for example, $C_{2-6}$ alkanol such as methanol) may be usually used. The concentration of the ionic liquid-containing liquid (A) in the impregnation liquid is, for example, from 0.001 to 100 wt. %, preferably from 0.01 to 50 wt. % (for example, from 0.05 to 30 wt. %), and more preferably from 0.1 to 10 wt. % (for example, from 0.1 to 8 wt. %).

The method for impregnating an impregnation liquid is not particularly limited, and for example, a method in which an impregnation liquid is injected under pressure may be used. Specifically, in the laminate (IL-free laminate) having the IL non-affinitive porous layer (B) and the IL affinitive porous layer (C), the surface of the laminate (or outermost layer of the laminate) on the IL affinitive porous layer (C) side is brought into contact with the impregnation liquid, and the impregnation liquid may be impregnated by reducing a pressure on the opposite side (or suctioned from the opposite side) (IL non-affinitive porous layer (B) side). By such a method, the carbon dioxide separation membrane (IL-containing laminate) according to an embodiment of the present invention can be formed easily or efficiently.

In addition, when using the liquid mixture as the impregnation liquid, the carbon dioxide separation membrane (IL-containing laminate) may be prepared by volatilizing the solvent (or dispersion medium) after the impregnating. The solvent (or dispersion medium) is removed, and the equivalent film thickness of the ionic liquid-containing liquid (A) can be easily adjusted, and reduction in the thickness can be easily achieved. The method for volatilizing a solvent is not particularly limited, and the solvent may be volatilized by appropriately heating and/or reducing the pressure according to a boiling point or a vapor pressure of the solvent.

The carbon dioxide separation membrane (IL-containing laminate) according to an embodiment of the present invention does not preferably contain ionic liquid-containing liquid (A) whose content exceeds 100 parts by volume with respect to 100 parts by volume of voids in IL affinitive porous layer (C). That is, the carbon dioxide separation membrane (IL-containing laminate) preferably does not have a second ionic liquid containing layer which is adjacent to the IL affinitive porous layer (C) containing (or retaining) the ionic liquid-containing liquid (A) and contains the ionic liquid-containing liquid which the voids fail to retain. Therefore, from the viewpoint of improving the carbon dioxide permeation rate and handling property of the carbon dioxide separation membrane (IL-containing laminate), the IL affinitive porous layer (C) can include the ionic liquid-containing liquid (A) of a volume selected from the range of 100 parts by volume or less, for example, about from 0.1 to 99 parts by volume (for example, from 1 to 90 parts by volume), for example, from 3 to 80 parts by volume (for example, from 5 to 70 parts by volume), preferably from 10 to 50 parts by volume (for example, from 15 to 45 parts by volume), and more preferably about from 20 to 40 parts by volume (for example, from 25 to 35 parts by volume), with respect to 100 parts by volume of voids therein. In a case where the amount of ionic liquid-containing liquid (A) is too large, ease of handling may be impaired.

In the carbon dioxide separation membrane (IL-containing laminate) according to an embodiment of the present invention, the equivalent film thickness of the ionic liquid-containing liquid (A) is, for example, from 0.01 to μm, (for example, from 0.05 to 3 μm), preferably from 0.1 to 2 μm (for example, from 0.15 to 1.5 μm), and more preferably about from 0.2 to 1 μm (for example, from 0.2 to 0.7 μm). In a case where the equivalent film thickness is too large, the permeation rate may decrease.

In addition, the laminate (IL-free laminate) including the IL non-affinitive porous layer (B) and the IL affinitive porous layer (C) can be prepared by directly or indirectly stacking (or forming) the IL affinitive porous layer (C) on, for example, a surface of any one of the IL non-affinitive porous layer (B). The method for stacking (or forming) an IL affinitive porous layer (C) is not particularly limited, and may be, for example, pressure bonding, heat fusion, and adhesion with an adhesive or a pressure sensitive adhesive. Further, when the IL affinitive porous layer (C) is made of an inorganic material, the IL affinitive porous layer (C) may be formed by a known method, for example, a method of sintering a powdery inorganic material, but may be formed by a method including coating a dispersion (or slurry) in which a particulate (or powdery) inorganic material is dispersed in a dispersion medium and drying a coating film, from the viewpoint of easily or efficiently molding a predetermined porous layer and improving handling property.

Examples of the dispersion medium include those similar to the solvent (or dispersion medium) exemplified in the section of the impregnation liquid. These dispersion media can be used alone or two or more types can be used in combination. Of these dispersion media, water may be usually used. In a case where water is used as the dispersion medium, alcohols such as isopropanol may be added in a small amount as necessary (for example, from 0.01 to 10 parts by weight and preferably about from 0.1 to 2 parts by weight with respect to 100 parts by weight of an inorganic material) to improve the coating property to the IL non-affinitive porous layer (B).

In addition, as necessary, a binding agent (or binder) [for example, water-soluble resins such as carboxymethyl cellulose or salts thereof (such as sodium salt), hydroxyalkyl cellulose (hydroxyethyl cellulose, and hydroxypropyl cellulose), and methyl cellulose; latex such as styrene butadiene rubber latex] may be added in a small amount (for example, from 0.01 to 10 parts by weight and preferably about from 0.1 to 2 parts by weight with respect to 100 parts by weight of inorganic material). Although the binding agent is not always necessary, the IL affinitive porous layer (C) having a large film thickness can be usually prepared easily.

The concentration of the inorganic material in the dispersion is, for example, from 0.1 to 50 wt. %, preferably from 1 to 30 wt. %, and more preferably from 3 to 20 wt. % (for example, from 5 to 15 wt. %) with respect to the entire dispersion.

The coating method is not particularly limited, and examples thereof include the known method, for example, a roll coater method, an air knife coater method, a blade coater method, a rod coater method, a reverse coater method, a bar coater method, a comma coater method, a dip squeeze coater method, a die coater method, a gravure coater method, a micro gravure coater method, a silk screen coater method, a dip method, a spray method, and a spinner method. Of these methods, the bar coater method is widely used. As necessary, the dispersion (or coating liquid) may be coated a plurality of times.

In the coating step, the dispersion is further flow-cast or coated, and then the dispersion medium is evaporated to dry the coating film. The drying temperature can usually be selected according to the boiling point of the dispersion medium, and may be, for example, about from 50 to 150° C., preferably about from 80 to 120° C., and more preferably about from 90 to 110° C.

The carbon dioxide separation membrane (or IL-free laminate having the IL non-affinitive porous layer (B) and the IL affinitive porous layer (C)) according to an embodiment of the present invention may have a two-layered structure of the IL non-affinitive porous layer (B) and the IL affinitive porous layer (C), and furthermore may be a multilayer structure (for example, three to five-layered structure) of three or more layers including other layers (or third layer) such as a substrate layer. The third layer is not particularly limited as long as it can permeate gas, and examples thereof include the substrate layer [for example, metal (stainless steel) or a net (or mesh) made of a resin], an adhesive or pressure sensitive adhesive layer. The third layer may be used alone or two or more types of layers can be used in combination. From the viewpoint of the gas permeability, the carbon dioxide separation membrane (IL-containing laminate) according to an embodiment of the present invention preferably has a two to three-layered structure (particularly a two-layered structure). Further, from the viewpoint of effectively retaining or fixing the ionic liquid-containing liquid (A), the IL non-affinitive porous layer (B) and the IL affinitive porous layer (C) are preferably formed adjacent to each other.

The carbon dioxide separation membrane (IL-containing laminate) according to an embodiment of the present invention thus obtained is excellent in the gas permeability, and can be suitably used for the carbon dioxide separation membrane (carbon dioxide concentration membrane) for fertilizing plants, for example, in the agricultural field. In the carbon dioxide separation membrane according to an embodiment of the present invention, the IL affinitive porous layer (C) side containing the ionic liquid-containing liquid (A) is often used as a gas supply side (supply side or upstream side) and an opposite side (IL non-affinitive porous layer (B) side) is often used as a permeation side (or downstream side).

The carbon dioxide permeability coefficient in the carbon dioxide separation membrane according to an embodiment of the present invention is, for example, $0.5 \times 10^{-10}$ $cm^3 \cdot cm/(s \cdot cm^2 \; cmHg)$ or greater [for example, from $0.7 \times 10^{-10}$ to $4 \times 10^{-10}$ $cm^3 \cdot cm/(s \cdot cm^2 \cdot cmHg)$], preferably $1 \times 10^{-10}$ $cm^3 \cdot cm/(s \cdot cm^2 \cdot cmHg)$ or greater [for example, from $1.5 \times 10^{10}$ to $2.5 \times 10^{-10}$ $cm^3 \cdot cm/(s \cdot cm^2 \cdot cmHg)$], and more preferably about $2 \times 10^{-10}$ $cm^3 \cdot cm/(s \cdot cm^2 \cdot cmHg)$ or greater [for example, from $2.5 \times 10^{10}$ to $3.5 \times 10^{10}$ $cm^3 \cdot cm/(s \cdot cm^2 \cdot cmHg)$] under the condition of 27° C. and 1 atm.

The carbon dioxide permeation rate of the carbon dioxide separation membrane may be, for example, $0.5 \times 10^{-3}$ mL/second or greater (for example, from $1 \times 10^{-3}$ to $5 \times 10^{-3}$ mL/second), preferably $1.2 \times 10^{-3}$ mL/second or greater (for example, from $1.4 \times 10^{-3}$ to $3 \times 10^{-3}$ mL/second), more preferably $1.6 \times 10^{-3}$ mL/second or greater (for example, from $1.7 \times 10^{-3}$ to $2.5 \times 10^{-3}$ mL/second) under the conditions 27° C., 1 atm, a differential pressure between the supply side and the permeation side of 50 to 100 kPa (for example, about from 65 to 90 kPa), and membrane area of about 12.57 $cm^2$.

Note that the carbon dioxide permeability coefficient and the carbon dioxide permeation rate can be measured by the method described in Examples described later.

Carbon Dioxide Concentrating Device Including Carbon Dioxide Separation Membrane The carbon dioxide concentrating device (or carbon dioxide separating device) according to an embodiment of the present invention includes the carbon dioxide separation membrane. The shape of the carbon dioxide separation membrane is not particularly limited, and may be, for example, a flat membrane shape, a spiral shape in which a flat membrane is wound, or a hollow fiber membrane shape. These shapes can be used alone or two or more types can be used in combination. For the carbon dioxide separation membrane, a membrane module (concentration unit or separation unit) is usually made together with a support material for supporting or fixing the carbon dioxide separation membrane. The material or shape of the support material are not particularly limited as long as it does not inhibit gas permeation, and is appropriately selected according to the shape of the carbon dioxide separation membrane. Further, the concentration unit may include one carbon dioxide separation membrane, or may include two or more carbon dioxide separation membranes.

In many cases, the carbon dioxide concentrating device further includes an intake unit for supplying a gas component containing carbon dioxide (for example, air) to the carbon dioxide separation membrane in addition to the concentration unit. The intake unit can supply a gas component containing carbon dioxide to the carbon dioxide separation membrane by generating a pressure difference between the upstream side (or gas supply side) and the downstream side (permeation side) of the concentration unit. The intake unit is not particularly limited as long as it can generate the pressure difference, and may be disposed on the upstream side, or may be disposed on the downstream side of the concentration unit. Specifically, for example, an air compressor disposed on the upstream side, a pump (for example, a diaphragm pump) disposed on the downstream side of the concentration unit may be used.

Since the carbon dioxide concentrating device according to an embodiment of the present invention can be operated as long as it includes at least the concentration unit and the intake unit, the configuration (or design) of the carbon dioxide concentrating device can be simplified and the size thereof can be easily reduced. Further, the permeation rate (carbon dioxide permeation rate) of the carbon dioxide concentration membrane can be high, and the carbon dioxide can be concentrated (or enriched) efficiently even at a relatively low pressure difference. Therefore, even a small intake unit having low intake capacity can operate smoothly.

In the industrial field, the carbon dioxide concentrating device is used to concentrate the carbon dioxide and reliably remove the carbon dioxide from gas components containing carbon dioxide (for example, exhaust gas discharged from factories; and energy resources such as natural gas). In addition, the gas components of interest in the industrial field are often at a high pressure, and the ability to selectively separate carbon dioxide from such gas components is regarded as important.

On the other hand, in the agricultural field (or fertilization application), the carbon dioxide concentrating device is used to supply the carbon dioxide from the atmosphere to such an extent that the indoor concentration of the carbon dioxide can be maintained at a predetermined level. Usually, in fertilization applications, it is known that even the decrease in carbon dioxide concentration of about 100 ppm (on a volume basis) can have a large impact on the yield of plants (or crops). For this reason, the carbon dioxide separation membrane used for fertilization application is required to be able to supply an appropriate amount of carbon dioxide smoothly. That is, the balance between the separation ability and the permeation rate of the carbon dioxide is very important. Therefore, the carbon dioxide separation membrane (or carbon dioxide concentrating device) according to an embodiment of the present invention capable of separating (concentrating or supplying) the carbon dioxide at a high permeation rate of the carbon dioxide even at a relatively low pressure difference can be suitably used for the fertilization applications of the carbon dioxide in the agricultural field.

The plant to be fertilized is not particularly limited, and is usually a plant cultivated indoors such as an agricultural or horticultural facility (for example, a greenhouse, a vinyl house, and a plant factory). Specifically, for example, fruits or vegetables such as strawberries, tomatoes, cucumbers, and bean sprouts, and flower buds (or ornamental plants) such as roses, and aquatic plants may be fertilized.

EXAMPLES

Hereinafter, the present invention will be described in more detail based on Examples, but is not limited to these Examples. Materials used in Examples are shown below.
Material
Ionic Liquid emimDCA: 1-ethyl-3-methylimidazolium dicyanamide, available from Tokyo Chemical Industry Co., Ltd.

emimTFSA: 1-ethyl-3-methylimidazolium bis(trifluoromethanesulfonyl) amide [or 1-ethyl-3-methylimidazolium bis(trifluoromethanesulfonyl) imide], available from Tokyo Chemical Industry Co., Ltd.

$P_{4444}$Pro: tetrabutylphosphonium prolinate, synthesized in accordance with the description in JP 2014-139149A [0034].
Second Liquid or Transportation Accelerator TETA: triethylenetetramine, available from Tokyo Chemical Industry Co., Ltd.
Ionic Liquid Non-Affinitive Porous Layer (B)

PE porous membrane: "U-Pore" available from Ube Industries, Ltd., porous membrane made of polyethylene, pore diameter of 0.1 µm, thickness of µm Durapel: "Durapel" available from Merck Millipore, produced by surface-treating polyvinylidene fluoride (PVDF) porous membrane with a fluorine-containing monomer, pore diameter of 0.22 µm, thickness of 125 µm PVDF filter-1: "Durapore GVHP" available from Merck Millipore, porous membrane made of polyvinylidene fluoride (PVDF), pore diameter of 0.22 µm, thickness of 125 µm PVDF filter-2: "Durapore VVHP" available from Merck Millipore, porous membrane made of polyvinylidene fluoride (PVDF), pore diameter of 0.1 µm, thickness of 125 µm Cellulose acetate filter: "C020A047A" available from ADVANTEC, Co. Ltd., porous membrane made of cellulose acetate, pore diameter of 0.2 µm, thickness of 20 µm Kiriyama filter paper: "Kiriyama Rohte filter paper No. SC" available from Kiriyama glass Co., collection particle size of 1 µm, thickness of 200 µm.
IL Affinitive Porous Layer (C)

Alumina particles: "α-alumina" available from Wako Pure Chemical Industries, Ltd., average particle size (catalog value): about 1 µm, average particle size (actually measured value) on number basis: 0.94 µm; indeterminate shape. The average particle size (measured value) on number basis was obtained by capturing an image of the particles at a magnification of 10000 times using a scanning electron microscope ("JSM-6700F" available from JEOL Ltd.), measuring major axis lengths of any 20 particles, and calculating an average value of the obtained major axis lengths.

Hydrophilic PVDF filter-1: "Durapore GVWP" available from Merck Millipore, a porous membrane made of polyvinylidene fluoride (PVDF), which has been subjected to hydrophilization treatment (treatment of chemically bonding a hydrophilic group to a PVDF main chain), pore diameter of 0.22 µm, thickness of 125 µm Hydrophilic PVDF filter-2: "Durapore VVPP" available from Merck Millipore, a porous membrane made of polyvinylidene fluoride (PVDF), which has been subjected to hydrophilization treatment (treatment of chemically bonding a hydrophilic group to a PVDF main chain), pore diameter of 0.1 µm, thickness of 125 µm.

Permeability Evaluation of Ionic Liquid to Various Base Materials

The base material (or IL-free laminate) was cut into a circle having a diameter of 4 cm and fixed to a funnel placed on a suction bottle. The ionic liquid was dropped onto the fixed base material, and the pressure was reduced on the opposite side to the surface on which the ionic liquid was dropped, so that the pressure difference was 30 kPa. The permeability of the dropped ionic liquid to the base material was confirmed visually and evaluated according to the following criteria.

Good: Spreads on the base material without passing through the base material and without forming droplets Somewhat poor: Repelled on the base material and forms droplets Poor: Passes through the base material.

particle dispersion and Durapel was used as an IL non-affinitive porous layer (B), an IL-free laminate was prepared in the same manner as in Example 1, and permeability of an ionic liquid to the obtained IL-free laminate was evaluated.

Comparative Examples 1 to 8

Without forming an IL-free laminate, permeability of an ionic liquid was evaluated using only an IL non-affinitive porous layer (B) or an IL affinitive porous layer (C) shown in Table 1 as a base material.

The results of Examples 1 and 2 and Comparative Examples 1 to 8 are shown in Table 1.

TABLE 1

| | Type of base material | | Permeability of ionic liquid | |
|---|---|---|---|---|
| | IL non-affinitive porous layer (B) | IL affinitive porous layer (C) | emimTFSA | emimDCA |
| Example 1 | PE porous membrane | Alumina particle membrane | Good | Good |
| Example 2 | Durapel | Alumina particle membrane | Good | Good |
| Comparative Example 1 | PE porous membrane | — | Somewhat poor | Somewhat poor |
| Comparative Example 2 | Durapel | — | Somewhat poor | Somewhat poor |
| Comparative Example 3 | PVDF filter 1 | — | Poor | Poor |
| Comparative Example 4 | — | Hydrophilic PVDF filter 1 | Poor | Poor |
| Comparative Example 5 | PVDF filter 2 | — | Poor | Poor |
| Comparative Example 6 | — | Hydrophilic PVDF filter 2 | Poor | Poor |
| Comparative Example 7 | Cellulose acetate filter | — | Poor | Somewhat poor |
| Comparative Example 8 | Kiriyama filter paper | — | Poor | Poor |

Example 1

Alumina particles and water were mixed to prepare an alumina particle dispersion (alumina particle slurry) having a concentration from 8 to 10 wt. %. The alumina particle slurry was coated onto a PE porous membrane as an IL non-affinitive porous layer (B) by a bar coater method using a wire bar and dried at 100° C. for 1 minute, thereby forming an IL affinitive porous layer (C). The alumina particle slurry was coated such that the dried IL affinitive porous layer (C) had a thickness of 5 μm. Permeability to an ionic liquid was evaluated using the obtained IL-free laminate. The ionic liquid was dropped onto the IL affinitive porous layer (C) side of the fixed IL-free laminate, and a pressure was reduced on an opposite side (IL non-affinitive porous layer (B) side) to the surface on which the ionic liquid was dropped.

Example 2

Except that 1 wt. % of isopropanol (IPA) with respect to a weight of alumina particles was added to an alumina As is clear from the results in Table 1, compared to Comparative Examples, in Example in which the IL-free laminate was formed, the ionic liquid did not permeate through and could be kept stable in the base material in the liquid state.

Evaluation of Appearance with Respect to Amount of Ionic Liquid-Containing Liquid (A)

Examples 3 to 6

An IL-free laminate of a PE porous membrane as an IL non-affinitive porous layer (B) and an alumina particle membrane as an IL affinitive porous layer (C) prepared in Example 1 was cut into a circle having a diameter of 4 cm, and fixed to a funnel placed on a suction bottle. An aqueous solution of emimDCA [concentration of IL-containing liquid (A): 0.14 wt. % (Example 3), 0.28 wt. % (Example 4), 1.39 wt. % (Example 5), 5.58 wt. % (Example 6)] was used as an impregnation liquid containing an IL-containing liquid (A), and was coated on the IL affinitive porous layer (C) side to a basis weight of the IL-containing liquid (A) as shown in Table 2. The pressure was reduced from the IL non-affinitive porous layer (B) side to make a pressure difference of 30 kPa. Next, the laminate was dried at 60° C. for 10 hours under the reduced pressure using a vacuum dryer to prepare the carbon dioxide separation membrane (IL-containing laminate). Table 2 shows the evaluation results of the appearance of the obtained carbon dioxide separation membrane. In addition, the basis weight was calculated from the weight change of the laminate before and after the coating of the ionic liquid-containing liquid (A).

Examples 7 to 10

An IL-free laminate of Durapel as an IL non-affinitive porous layer (B) and an alumina particle membrane as an IL affinitive porous layer (C) prepared in Example 2 was cut into a circle having a diameter of 4 cm, and fixed to a funnel placed on a suction bottle. An aqueous solution of emimDCA [concentration of IL-containing liquid (A): 0.14 wt. % (Example 7), 0.28 wt. % (Example 8), 1.39 wt. % (Example 9), 5.58 wt. % (Example 10)] as an impregnation liquid was used, and was coated to a basis weight of the IL-containing liquid (A) [emimDCA] as shown in Table 3. The pressure was reduced from the IL non-affinitive porous layer (B) side to make a pressure difference of 30 kPa. Next, the laminate was dried at 60° C. for 10 hours under the reduced pressure using a vacuum dryer to prepare the carbon dioxide separation membrane. Table 3 shows the evaluation results of the appearance of the obtained carbon dioxide separation membrane.

Examples 11 to 14

A carbon dioxide separation membrane was prepared in the same manner as in Example 7 except that instead of an aqueous solution of emimDCA as an impregnation liquid containing an IL-containing liquid (A), a methanol solution of emimTFSA [concentration of IL-containing liquid (A): 0.19 wt. % (Example 11), 0.38 wt. % (Example 12), 1.91 wt. % (Example 13), 7.64 wt. % (Example 14)] was used and was coated to a basis weight of the IL-containing liquid (A) [emimTFSA] as shown in Table 4. Table 4 shows the evaluation results of the appearance of the obtained carbon dioxide separation membrane.

Examples 15 to 18

A carbon dioxide separation membrane was prepared in the same manner as in Example 3, except that, instead of an aqueous solution of emimDCA as an impregnation liquid containing an IL-containing liquid (A), an aqueous solution of $P_{4444}Pro$ [concentration of IL-containing liquid (A): 0.12 wt. % (Example 15), 0.25 wt. % (Example 16), 1.24 wt. % (Example 17), and 4.94 wt. % (Example 18)] was used and was coated to a basis weight of the IL-containing liquid (A) [$P_{4444}Pro$] as shown in Table 5. Table 5 shows the evaluation results of the appearance of the obtained carbon dioxide separation membrane.

Examples 19 to 22

A carbon dioxide separation membrane was prepared in the same manner as in Example 3 except that, instead of an aqueous solution of emimDCA as an impregnation liquid, an aqueous solution containing an equimolar mixed liquid of $P_{4444}Pro$ and TETA [concentration of the IL-containing liquid (A): 0.12 wt. % (Example 19), 0.25 wt. % (Example 20), 1.23 wt. % (Example 21), and 4.94 wt. % (Example 22)] was used and was coated to a basis weight of the IL-containing liquid (A) [$P_{4444}Pro$/TETA] as shown in Table 6. Table 6 shows the evaluation results of the appearance of the obtained carbon dioxide separation membrane.

In the table, the porosity sc of the IL affinitive porous layer (C) was calculated by the following equation.

$$\varepsilon_C[\%]=(1-\rho_C/\rho_{C0})\times100$$

where $\varepsilon_C$ represents the porosity of the IL affinitive porous layer (C), pc represents a bulk density of the IL affinitive porous layer (C), and $\rho_{C0}$ represents a true density (for example, true density at room temperature of about 25° C.) of the formation component of the IL affinitive porous layer (C).

In the table, the "maximum basis weight" means the maximum value of the amount of ionic liquid-containing liquid (A) which can be included within voids in the IL affinitive porous layer (C) per unit area, and was calculated by the following equation.

$$\text{(Maximum basis weight)}[g/m^2]=\rho_A\times(V_C\times\varepsilon_C)/S$$

where $\rho_A$ represents a density of the ionic liquid-containing liquid (A) (for example, density at room temperature of about 25° C.), $V_C$ represents a volume of the IL affinitive porous layer (C) (the total volume including voids), sc represents a porosity of the IL affinitive porous layer (C), and S represents an area of the IL affinitive porous layer (C) (or carbon dioxide separation membrane).

In the table, the "equivalent film thickness" means the film thickness of the liquid film when the liquid film is formed to have the same area as the carbon dioxide separation membrane (circle shape having a diameter of 4 cm) using the same amount of liquid as the retained ionic liquid-containing liquid (A). "Equivalent film thickness" was calculated by the following equation.

$$t=\text{(basis weight)}/\rho A$$

where t represents the equivalent film thickness [μm], and $\rho_A$ represents the density of the ionic liquid-containing liquid (A) (for example, the density at room temperature of about 25° C.).

TABLE 2

|  | Example 3 | Example 4 | Example 5 | Example 6 |
| --- | --- | --- | --- | --- |
| IL-containing liquid (A) | emimDCA | emimDCA | emimDCA | emimDCA |
| IL non-affinitive porous layer (B) | PE porous membrane | PE porous membrane | PE porous membrane | PE porous membrane |
| IL affinitive porous layer (C) | Alumina particle membrane | Alumina particle membrane | Alumina particle membrane | Alumina particle membrane |
| Thickness of porous layer (C) [μm] | 5 | 5 | 5 | 5 |
| Porosity of porous layer (C) [%] | 32 | 32 | 32 | 32 |
| Maximum basis weight [g/m$^2$] | 1.78 | 1.78 | 1.78 | 1.78 |
| Liquid (A) basis weight [g/m$^2$] | 0.72 | 1.75 | 6.45 | 24.59 |
| Equivalent film thickness [μm] | 0.65 | 1.58 | 5.81 | 22.15 |

TABLE 2-continued

|  | Example 3 | Example 4 | Example 5 | Example 6 |
|---|---|---|---|---|
| Appearance of $CO_2$ separation membrane (Dry state) | Dried, and liquid does not stick to hand when touched | Substantially dried | There is some liquid pool | Liquid accumulates on surface of membrane and is wet |

TABLE 3

|  | Example 7 | Example 8 | Example 9 | Example 10 |
|---|---|---|---|---|
| IL-containing liquid (A) | emimDCA | emimDCA | emimDCA | emimDCA |
| IL non-affinitive porous layer (B) | Durapel | Durapel | Durapel | Durapel |
| IL affinitive-porous layer (C) | Alumina particle membrane | Alumina particle membrane | Alumina particle membrane | Alumina particle membrane |
| Thickness of porous layer (C) [μm] | 5 | 5 | 5 | 5 |
| Porosity of porous layer (C) [%] | 32 | 32 | 32 | 32 |
| Maximum weight [g/m$^2$] | 1.78 | 1.78 | 1.78 | 1.78 |
| Liquid (A) basis weight [g/m$^2$] | 0.64 | 1.19 | 6.13 | 25.07 |
| Equivalent film thickness [μm] | 0.57 | 1.08 | 5.52 | 22.58 |
| Appearance of $CO_2$ separation membrane (Dry state) | Dried, and liquid does not stick to hand when touched | Substantially dried | There is some liquid pool | Liquid accumulates on surface of membrane and is wet |

TABLE 4

|  | Example 11 | Example 12 | Example 13 | Example 14 |
|---|---|---|---|---|
| IL-containing liquid (A) | emimTFSA | emimTFSA | emimTFSA | emimTFSA |
| IL non-affinitive porous layer (B) | Durapel | Durapel | Durapel | Durapel |
| IL affinitive porous layer (C) | Alumina particle membrane | Alumina particle membrane | Alumina particle membrane | Alumina particle membrane |
| Thickness of porous layer (C) [μm] | 5 | 5 | 5 | 5 |
| Porosity of porous layer (C) [%] | 32 | 32 | 32 | 32 |
| Maximum basis weight [g/m$^2$] | 2.43 | 2.43 | 2.43 | 2.43 |
| Liquid (A) basis weight [g/m$^2$] | 0.80 | 1.83 | 8.28 | 31.04 |
| Equivalent film thickness [μm] | 0.52 | 1.26 | 5.44 | 20.42 |
| Appearance of $Co_2$ separation membrane (Dry state) | Dried, and liquid does not stick to hand when touched | Substantially dried | There is some liquid pool | Liquid accumulates on surface of membrane and is wet |

TABLE 5

|  | Example 15 | Example 16 | Example 17 | Example 18 |
|---|---|---|---|---|
| IL-containing liquid (A) | $P_{4444}$Pro | $P_{4444}$Pro | $P_{4444}$Pro | $P_{4444}$Pro |
| IL non-affinitive porous layer (B) | PE porous membrane | PE porous membrane | PE porous membrane | PE porous membrane |
| IL affinitive porous layer (C) | Alumina particle membrane | Alumina particle membrane | Alumina particle membrane | Alumina particle membrane |
| Thickness of porous layer (C) [μm] | 5 | 5 | 5 | 5 |
| Porosity of porous layer (C) [%] | 32 | 32 | 32 | 32 |
| Maximum basis weight [g/m$^2$] | 1.57 | 1.57 | 1.57 | 1.57 |
| Liquid (A) basis weight [g/m$^2$] | 0.45 | 1.19 | 6.55 | 21.40 |
| Equivalent film thickness [μm] | 0.46 | 1.21 | 6.66 | 21.77 |
| Appearance of $CO_2$ separation membrane (Dry state) | Dried, and liquid does not stick to hand when touched | Substantially dried | There is some liquid pool | Liquid accumulates on surface of membrane and is wet |

TABLE 6

|  | Example 19 | Example 20 | Example 21 | Example 22 |
|---|---|---|---|---|
| IL-containing liquid (A) | $P_{4444}$Pro/TETA | $P_{4444}$Pro/TETA | $P_{4444}$Pro/TETA | $P_{4444}$Pro/TETA |
| IL non-affinitive porous layer (B) | PE porous membrane | PE porous membrane | PE porous membrane | PE porous membrane |
| IL affinitive porous layer (C) | Alumina particle membrane | Alumina particle membrane | Alumina particle membrane | Alumina particle membrane |
| Thickness of porous layer (C) [μm] | 5 | 5 | 5 | 5 |
| Porosity of porous layer (C) [%] | 32 | 32 | 32 | 32 |
| Maximum basis weight [g/m²] | 1.57 | 1.57 | 1.57 | 1.57 |
| Liquid (A) basis weight [g/m²] | 0.49 | 0.93 | 4.36 | 15.86 |
| Equivalent film thickness [μm] | 0.49 | 0.95 | 4.44 | 16.15 |
| Appearance of $CO_2$ separation membrane (Dry state) | Dried, and liquid does not stick to hand when touched | Substantially dried | There is some liquid pool | Liquid accumulates on surface of membrane and is wet |

As is apparent from Tables 2 to 6, the carbon dioxide separation membrane according to Examples can be easily formed and can stably retain or fix the ionic liquid in a liquid state. In particular, as in Examples 3 to 4, 7 to 8, 11 to 12, 15 to 16, and 19 to 20, it was found that in a case where the basis weight of the ionic liquid-containing liquid (A) was the maximum basis weight or less, not only the surface of the carbon dioxide separation membrane (IL-containing laminate) was not sticky, but also the liquid did not exude when touched, thus the ionic liquid was stably retained (or fixed) in the liquid state and also exhibited excellent handling property. In addition, the thickness of the IL affinitive porous layer (C) and the equivalent film thickness of the IL-containing liquid (A) can be easily reduced as shown in Examples, so the handling property of the carbon dioxide separation membrane can be maintained and the gas permeability (for example, permeation rate) can be effectively improved.

Example 23

A carbon dioxide separation membrane was prepared in the same manner as in Example 3, except that a red aqueous ink was further added to an aqueous solution of emimDCA as an impregnation liquid containing an IL-containing liquid (A). The obtained carbon dioxide separation membrane was sandwiched with adhesive tapes and fixed, frozen, and cut with a razor to prepare a slice. The results of observing the cross section of the slice with a CCD camera are shown in FIG. 1. As is apparent from FIG. 1, it was confirmed that, in the IL affinitive porous layer (C), the IL-containing liquid (A) was spread and distributed on the side of the IL non-affinitive porous layer (B) in its surface direction (or in a flat shape). For this reason, it is estimated that when a user touches the surface of the carbon dioxide separation membrane, the ionic liquid-containing liquid (A) does not deposit on the user's hand, and thus the carbon dioxide separation membrane is excellent in handling property.

Evaluation on Concentration Characteristics of Carbon Dioxide

Figure 2:
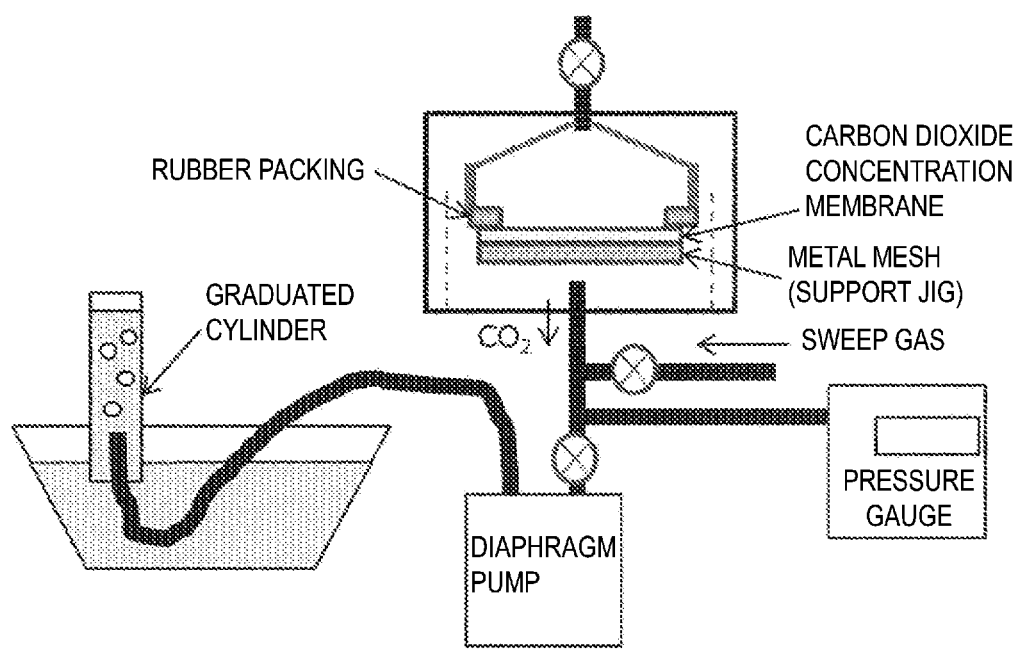
FIG. 2 is a schematic diagram of a device for evaluating carbon dioxide concentration characteristics of Examples.

Under the conditions of room temperature of 27° C. and 1 atm, the device shown in FIG. 2 was used to create the pressure difference shown in Table 8 below to supply air outside the system to the carbon dioxide separation membrane (IL-containing laminate) and permeate the air therethrough, thereby performing the evaluation. Details of the measurement method are shown below.

Measurement of Gas Permeation Rate

The gas in the system was suctioned with a diaphragm pump, and the exhausted gas [the mixed gas of the gas that has permeated through the IL-containing laminate and the sweep gas (air controlled to an inflow rate of 60 mL/min) to flow the gas and to prevent gas congestion] was collected in a 100 mL graduated cylinder by a water displacement method, and time $T_{100}$ [sec] required to collect 100 mL of gas was measured. The permeation rate v (mL/sec) of the gas that permeates the carbon dioxide separation membrane (IL-containing laminate) was calculated by the following equation.

$$v[mL/sec]=(100-T_{100})/T_{100}$$

where v represents the permeation rate [mL/sec] of the gas that has permeated through the IL-containing laminate, and $T_{100}$ represents the time [sec] required to collect 100 mL of gas discharged from the diaphragm pump.

Measurement of Concentration of Carbon Dioxide in Collected Gas

An outlet of the gas discharged from the diaphragm was connected to a gas analysis Tedlar bag (polyvinyl fluoride, available from GL Sciences, Inc.), and about 400 mL of discharged gas was collected. The collected gas was passed through a detection tube for analysis of carbon dioxide ("GV-100S" available from Gastec Co., Ltd.), and the concentration of the carbon dioxide C (on a volume basis) [ppm] in the exhaust gas was determined. By subtracting the carbon dioxide concentration in the sweep gas (or carbon dioxide concentration in the air) $C_S$ from the obtained carbon dioxide concentration C, the concentration $C_{IL}$ ($=C-C_S$), the carbon dioxide concentration increased by the concentration (the value corresponding to the carbon dioxide supplied (or concentrated) from the atmosphere through a carbon dioxide separation membrane (IL-containing laminate)), was calculated.

Based on the measurement results obtained from the above evaluation, the concentration rate of the carbon dioxide [permeation rate of carbon dioxide or permeation rate of $CO_2$] $v_{CO2}$ of the carbon dioxide separation membrane (IL-containing laminate) and the permeability coefficient of the carbon dioxide (permeability coefficient of $CO_2$) P were calculated by the following equations.

$$v_{CO2} = v \times C_{IL} \times 10^{-6}$$

where $v_{CO2}$ represents the permeation rate [mL/sec] of $CO_2$ permeating through the IL-containing laminate, v represents the permeation rate [mL/sec] of gas permeating through the IL-containing laminate, and $C_{IL}$ represents the concentration [ppm] of the carbon dioxide (on volume basis) increased by the concentration (supplied from the atmosphere through the carbon dioxide separation membrane (IL-containing laminate)).

$$P = v_{CO2}/S/p \times t$$

where P represents the permeability coefficient [$cm^3 \cdot cm/(s \cdot cm^2 \cdot cmHg)$] of $CO_2$, $v_{CO2}$ represents the permeation rate [mL/sec] of $CO_2$, S represents the area of the carbon dioxide separation membrane (area of the IL-containing laminate) [$cm^2$], p represents the pressure difference [cmHg] between the upstream side (supply side) and the downstream side (reduced pressure side or permeation side) of the carbon dioxide separation membrane (IL-containing laminate), and t represents the equivalent film thickness [cm] of the ionic liquid-containing liquid (A)).

Examples 24 and 26

A carbon dioxide separation membrane (IL-containing laminate) was prepared in the same manner as in Example 7, except that an aqueous solution of emimDCA [concentration of IL-containing liquid (A): 0.14 wt. % (Example 24) and 0.28 wt. % (Example 26)] was used as an impregnation liquid and was coated to a basis weight of an ionic liquid-containing liquid (A) [emimDCA] shown in Table 7. Table 8 shows the evaluation results on the carbon dioxide concentration characteristics of the obtained carbon dioxide separation membrane (IL-containing laminate).

Examples 25, 27, 33 and 34

A carbon dioxide separation membrane (IL-containing laminate) was prepared in the same manner as in Example 3, except that an aqueous solution of emimDCA [concentration of IL-containing liquid (A): 0.14 wt. % (Example 25), 0.28 wt. % (Example 27), 1.39 wt. % (Example 33), and 5.58 wt. % [Example 34)] was used as an impregnation liquid and was coated to a basis weight of an ionic liquid-containing liquid (A) [emimDCA] shown in Table 7. Table 8 shows the evaluation results on the carbon dioxide concentration characteristics of the obtained carbon dioxide separation membrane (IL-containing laminate).

Examples 28, 29, 35, and 36

A carbon dioxide separation membrane (IL-containing laminate) was prepared in the same manner as in Example 7, except that a methanol solution of emimTFSA [concentration of IL-containing liquid (A): 0.38 wt. % (Examples 28 and 29) and 1.91 wt. % (Examples 35 and 36)] was used as an impregnation liquid and was coated to a basis weight of an ionic liquid-containing liquid (A) [emimTFSA] shown in Table 7. Table 8 shows the evaluation results on the carbon dioxide concentration characteristics of the obtained carbon dioxide separation membrane (IL-containing laminate).

Examples 30, 31, 37, 38

A carbon dioxide separation membrane (IL-containing laminate) was prepared in the same manner as in Example 3 except that an aqueous solution of $P_{4444}$Pro [concentration of the IL-containing liquid (A): 0.12 wt. % (Example 30), 0.25 wt. % (Example 31), 1.24 wt. % (Example 37), and 4.94 wt. % (Example 38)] was used as an impregnation liquid, and was coated to a basis weight of the ionic liquid-containing liquid (A) [$P_{4444}$Pro] shown in Table 7. Table 8 shows the evaluation results on the carbon dioxide concentration characteristics of the obtained carbon dioxide separation membrane (IL-containing laminate).

Examples 32, 39, and 40

A carbon dioxide separation membrane (IL-containing laminate) was prepared in the same manner as in Example 3, except that an aqueous solution containing an equimolar mixed liquid of $P_{4444}$Pro and TETA [concentration of the IL-containing liquid (A): 0.12 wt. % (Example 32), 1.23 wt. % (Example 39), and 4.94 wt. % (Example 40)] was used as an impregnation liquid and was coated to a basis weight of the ionic liquid-containing liquid (A) [$P_{4444}$Pro/TETA] shown in Table 7. Table 8 shows the evaluation results on the carbon dioxide concentration characteristics of the obtained carbon dioxide separation membrane (IL-containing laminate).

TABLE 7

| | Ionic liquid-containing liquid (A) | IL non-affinitive porous layer (B) | IL affinitive porous layer (C) | | Basis weight [g/m²] | Equivalent film thickness t [μm] |
|---|---|---|---|---|---|---|
| | | | Type | Thickness [μm] | | |
| Example 24 | emimDCA | Durapel | Alumina particle membrane | 5 | 0.63 | 0.57 |
| Example 25 | emimDCA | PE porous membrane | Alumina particle membrane | 5 | 0.72 | 0.65 |
| Example 26 | emimDCA | Durapel | Alumina particle membrane | 5 | 1.20 | 1.08 |
| Example 27 | emimDCA | PE porous membrane | Alumina particle membrane | 5 | 1.75 | 1.58 |
| Example 28 | emimTFSA | Durapel | Alumina particle membrane | 5 | 1.99 | 1.31 |

TABLE 7-continued

| | Ionic liquid-containing liquid (A) | IL non-affinitive porous layer (B) | IL affinitive porous layer (C) Type | Thickness [μm] | Basis weight [g/m²] | Equivalent film thickness t [μm] |
|---|---|---|---|---|---|---|
| Example 29 | emimTFSA | Durapel | Alumina particle membrane | 5 | 2.14 | 1.41 |
| Example 30 | P$_{4444}$Pro | PE porous membrane | Alumina particle membrane | 5 | 0.45 | 0.46 |
| Example 31 | P$_{4444}$Pro | PE porous membrane | Alumina particle membrane | 5 | 1.19 | 1.21 |
| Example 32 | P$_{4444}$Pro/TETA | PE porous membrane | Alumina particle membrane | 5 | 0.49 | 0.49 |
| Example 33 | emimDCA | PE porous membrane | Alumina particle membrane | 5 | 6.45 | 5.81 |
| Example 34 | emimDCA | PE porous membrane | Alumina particle membrane | 5 | 25.06 | 22.58 |
| Example 35 | emimTFSA | Durapel | Alumina particle membrane | 5 | 6.05 | 3.98 |
| Example 36 | emimTFSA | Durapel | Alumina particle membrane | 5 | 7.33 | 4.82 |
| Example 37 | P$_{4444}$Pro | PE porous membrane | Alumina particle membrane | 5 | 6.55 | 6.66 |
| Example 38 | P$_{4444}$Pro | PE porous membrane | Alumina particle membrane | 5 | 21.40 | 21.77 |
| Example 39 | P$_{4444}$Pro/TETA | PE porous membrane | Alumina particle membrane | 5 | 4.36 | 4.44 |
| Example 40 | P$_{4444}$Pro/TETA | PE porous membrane | Alumina particle membrane | 5 | 15.86 | 16.15 |

TABLE 8

| | Pressure difference [kPa] | Gas permeation rate v [mL/sec] | Increased concentration [ppm (on volume basis)] $C_{IL}$ of $CO_2$ | Permeability coefficient P [cm³·cm/(s·cm²·cmHg)] of $CO_2$ | Permeation rate $v_{CO2}$ [mL/sec] of $CO_2$ |
|---|---|---|---|---|---|
| Example 24 | 72.8 | 7.69 | 163 | $1.07 \times 10^{-10}$ | $1.25 \times 10^{-3}$ |
| Example 25 | 75.0 | 6.82 | 113 | $7.35 \times 10^{-11}$ | $7.67 \times 10^{-4}$ |
| Example 26 | 72.8 | 7.69 | 138 | $1.65 \times 10^{-10}$ | $1.06 \times 10^{-3}$ |
| Example 27 | 70.0 | 8.82 | 138 | $2.90 \times 10^{-10}$ | $1.21 \times 10^{-3}$ |
| Example 28 | 77.6 | 5.77 | 163 | $1.68 \times 10^{-10}$ | $9.38 \times 10^{-4}$ |
| Example 29 | 73.3 | 7.50 | 100 | $1.51 \times 10^{-10}$ | $7.50 \times 10^{-4}$ |
| Example 30 | 69.6 | 10.93 | 150 | $1.15 \times 10^{-10}$ | $1.64 \times 10^{-3}$ |
| Example 31 | 70.9 | 10.83 | 163 | $3.18 \times 10^{-10}$ | $1.76 \times 10^{-3}$ |
| Example 32 | 68.2 | 11.65 | 175 | $1.57 \times 10^{-10}$ | $2.04 \times 10^{-3}$ |
| Example 33 | 88.6 | 1.39 | 50 | $4.57 \times 10^{-11}$ | $6.94 \times 10^{-5}$ |
| Example 34 | 88.6 | 1.38 | 24 | $9.27 \times 10^{-11}$ | $3.45 \times 10^{-5}$ |
| Example 35 | 88.5 | 1.44 | 13 | $8.53 \times 10^{-12}$ | $1.79 \times 10^{-5}$ |
| Example 36 | 88.5 | 1.41 | 13 | $1.01 \times 10^{-11}$ | $1.76 \times 10^{-5}$ |
| Example 37 | 80.2 | 5.38 | 100 | $4.74 \times 10^{-10}$ | $5.38 \times 10^{-4}$ |
| Example 38 | 88.8 | 1.58 | 13 | $5.15 \times 10^{-11}$ | $1.98 \times 10^{-5}$ |
| Example 39 | 77.4 | 6.79 | 125 | $5.17 \times 10^{-10}$ | $8.49 \times 10^{-4}$ |
| Example 40 | 88.7 | 1.67 | 38 | $1.21 \times 10^{-10}$ | $6.26 \times 10^{-5}$ |

As is apparent from Tables 7 and 8, the carbon dioxide separation membrane according to Examples can effectively concentrate carbon dioxide from the atmosphere. In the carbon dioxide separation membranes (IL-containing laminates) of Examples 24 to 32, it was possible to reduce and adjust the equivalent film thickness and to concentrate carbon dioxide at a high permeation rate. Among them, in Examples 30 to 32 using P$_{444}$Pro, the permeation rate tends to be high, and in particular, in Example 32 in which TETA was added as the second liquid, the permeation rate was particularly high. It is presumed that TETA has a good affinity (or achieve good dispersion) with proline anion ([Pro]⁻) in the $P_{4444}Pro$, and thus TETA was allowed to interact with the carbon dioxide to the extent that the TETA did not inhibit the permeation (or desorption) of carbon dioxide.

INDUSTRIAL APPLICABILITY

Since the carbon dioxide separation membrane according to the present invention can stably retain (or fix) the ionic liquid and has excellent handling property (or handling characteristics), for example, in the agricultural field, it can be effectively used as a carbon dioxide separation membrane for fertilizing plants with carbon dioxide.

The invention claimed is:

1. A carbon dioxide separation membrane, comprising:
   an ionic liquid affinitive porous layer having an ionic liquid-containing liquid retained within voids; and
   an ionic liquid non-affinitive porous layer, wherein the ionic liquid affinitive porous layer includes inorganic materials,
   the inorganic materials are of particulate form; and
   the ionic liquid non-affinitive porous layer includes a thermoplastic resin.

2. The carbon dioxide separation membrane according to claim 1, wherein the inorganic materials include metal oxide particles having an average particle size from 0.001 to 5 μm on a number basis.

3. The carbon dioxide separation membrane according to claim 1, wherein an average thickness of the ionic liquid affinitive porous layer is from 0.01 to 10 μm.

4. The carbon dioxide separation membrane according to claim 1, wherein the ionic liquid-containing liquid includes an ionic liquid, the ionic liquid including a cation selected from ammoniums, imidazoliums, and phosphoniums, and an anion selected from a fluorine-containing anion, a cyano group-containing anion, and an anion derived from an amino acid.

5. The carbon dioxide separation membrane according to claim 1, wherein the ionic liquid affinitive porous layer includes the ionic liquid-containing liquid at a ratio of 0.1 to 99 parts by volume with respect to 100 parts by volume of the voids inside the ionic liquid affinitive porous layer.

6. The carbon dioxide separation membrane according to claim 1, wherein a film thickness of a liquid film that is formed of the same amount of liquid as the ionic liquid-containing liquid retained in the carbon dioxide separation membrane and has the same area as the carbon dioxide separation membrane is from 0.1 to 2 μm.

7. The carbon dioxide separation membrane according to claim 1, wherein the thermoplastic resin is at least one thermoplastic resin selected from a polyolefin-based resin, a fluororesin, and a cellulose derivative, and a contact angle of the ionic liquid non-affinitive porous layer with respect to the ionic liquid-containing liquid is from 90 to 150°.

8. The carbon dioxide separation membrane according to claim 1, wherein the ionic liquid-containing liquid further includes a second liquid which is miscible with the ionic liquid.

9. The carbon dioxide separation membrane according to claim 8, wherein the second liquid is polyamines.

10. The carbon dioxide separation membrane according to claim 9, wherein a ratio of the ionic liquid and the second liquid, (ionic liquid)/(the second liquid)(molar ratio), is from 25/75 to 75/25.

11. The carbon dioxide separation membrane according to claim 1, wherein the carbon dioxide separation membrane is suitable to fertilize a plant with carbon dioxide.

12. The carbon dioxide separation membrane according to claim 1, wherein the carbon dioxide separation membrane is suitable to cultivate a plant with carbon dioxide indoors.

13. A method for producing the carbon dioxide separation membrane described in claim 1, the method comprising: impregnating a liquid including the ionic liquid-containing liquid within the voids in the ionic liquid affinitive porous layer in a laminate including the ionic liquid non-affinitive porous layer and the ionic liquid affinitive porous layer.

14. A carbon dioxide concentrating device comprising the carbon dioxide separation membrane described in claim 1.

* * * * *